US010753415B2

(12) United States Patent
Kirby et al.

(10) Patent No.: US 10,753,415 B2
(45) Date of Patent: Aug. 25, 2020

(54) BRAKING SYSTEM FOR ELECTROMAGNETIC MOTORS

(71) Applicant: ILLINOIS TOOL WORKS INC., Glenview, IL (US)

(72) Inventors: Andrew Kirby, Buckinghamshire (GB); Graham E. Mead, Worminghall (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 14 days.

(21) Appl. No.: 16/057,976

(22) Filed: Aug. 8, 2018

(65) Prior Publication Data

US 2019/0085924 A1 Mar. 21, 2019

(30) Foreign Application Priority Data

Sep. 15, 2017 (GB) .................................. 1714884.2
Jul. 20, 2018 (EP) .................................... 18184860

(51) Int. Cl.

*F16D 66/00* (2006.01)
*F16D 59/02* (2006.01)
*F16D 65/28* (2006.01)
*F16D 63/00* (2006.01)
*H02P 3/06* (2006.01)
*G01D 11/16* (2006.01)
*H02P 3/04* (2006.01)
*H02P 7/025* (2016.01)

(Continued)

(52) U.S. Cl.

CPC ............. *F16D 66/00* (2013.01); *F16D 59/02* (2013.01); *F16D 63/002* (2013.01); *F16D 63/008* (2013.01); *F16D 65/28* (2013.01); *G01D 11/16* (2013.01); *H02P 3/04* (2013.01); *H02P 3/06* (2013.01); *H02P 3/16* (2013.01); *H02P 7/025* (2016.02); *F16D 2066/003* (2013.01); *F16D 2066/005* (2013.01); *F16D 2066/006* (2013.01); *F16D 2121/18* (2013.01); *F16D 2121/20* (2013.01); *F16D 2121/22* (2013.01); *F16D 2125/64* (2013.01); *F16D 2127/02* (2013.01); *F16D 2129/04* (2013.01); *G05B 19/406* (2013.01); *G05B 19/416* (2013.01); *H02P 15/00* (2013.01)

(58) Field of Classification Search

CPC ......... G01B 9/00; G01B 11/00; F16D 63/008; F16D 66/00; F16D 2066/003; F16D 2066/005; F16D 2066/006; H02P 3/04; H02P 3/06; H02P 3/16

USPC ....................................... 73/1.79, 121, 865.9

See application file for complete search history.

(56) References Cited

U.S. PATENT DOCUMENTS 4,761,598 A 8/1988 Lovrenich
4,798,269 A 1/1989 Lindner (Continued)

FOREIGN PATENT DOCUMENTS

AU 2015101320 A4 10/2015
EP 2054219 5/2009

(Continued)

*Primary Examiner* — Benjamin R Schmitt
(74) *Attorney, Agent, or Firm* — Thompson Hine LLP

(57) ABSTRACT

A method for monitoring the performance of a mechanical brake for a linear electromagnetic motor, the linear motor having a linearly moveable output shaft, comprising monitoring travel of the output shaft over the duration of actuation of the mechanical brake and comparing said travel with a predetermined travel threshold.

13 Claims, 16 Drawing Sheets

(51) Int. Cl.

| | |
|---|---|
| ***H02P 3/16*** | (2006.01) |
| *F16D 121/20* | (2012.01) |
| *F16D 121/18* | (2012.01) |
| *G05B 19/406* | (2006.01) |
| *G05B 19/416* | (2006.01) |
| *H02P 15/00* | (2006.01) |
| *F16D 121/22* | (2012.01) |
| *F16D 125/64* | (2012.01) |
| *F16D 127/02* | (2012.01) |
| *F16D 129/04* | (2012.01) |

(56) References Cited

U.S. PATENT DOCUMENTS

| | | | | |
|---|---|---|---|---|
| 5,274,290 | A | 12/1993 | Fischer | |
| 5,859,395 | A | 1/1999 | Fargo | |
| 6,234,060 | B1 | 5/2001 | Jolly | |
| 6,471,015 | B1 * | 10/2002 | Ralea | B60T 8/1703 188/1.11 L |
| 6,554,108 | B1 * | 4/2003 | Bohm | B60T 17/221 188/1.11 E |
| 2007/0000734 | A1 | 1/2007 | Hanninen | |
| 2007/0126281 | A1 * | 6/2007 | Zumberge | B60T 13/741 303/3 |
| 2007/0225890 | A1 | 9/2007 | Ringlstetter | |
| 2009/0206132 | A1 | 8/2009 | Hueil | |
| 2010/0078288 | A1 | 4/2010 | Heinrich | |
| 2010/0145639 | A1 | 6/2010 | Fu | |
| 2010/0230217 | A1 | 9/2010 | Mead | |
| 2011/0295557 | A1 | 12/2011 | Hedin | |
| 2014/0311257 | A1 * | 10/2014 | Hubbard | B66B 5/0037 73/862.12 |
| 2015/0190675 | A1 | 7/2015 | Silagy | |
| 2017/0038768 | A1 | 2/2017 | Ikai | |
| 2019/0089271 | A1 | 3/2019 | Kirby | |
| 2019/0089272 | A1 | 3/2019 | Briodeau-Line | |
| 2019/0089273 | A1 | 3/2019 | Kirby | |
| 2019/0226450 | A1 | 7/2019 | Theopold | |

FOREIGN PATENT DOCUMENTS

| | | | |
|---|---|---|---|
| EP | 2054219 | | 4/2011 |
| EP | 3203627 | | 8/2017 |
| JP | H0720062 | U | 4/1995 |
| JP | 2011140370 | A | 7/2011 |
| JP | 2015148516 | A | 8/2015 |
| WO | WO 2008023227 | | 2/2008 |
| WO | WO 2011056331 | | 5/2011 |
| WO | WO 2013066321 | | 5/2013 |
| WO | WO2017132525 | A1 | 8/2017 |

* cited by examiner

Brake OFF (released)

Brake ON (engaged)

Brake Axis Orientation

BRAKING SYSTEM FOR ELECTROMAGNETIC MOTORS

TECHNICAL FIELD

The present invention relates to emergency braking systems and methods of use thereof, particularly those for electromagnetic motors for use in test apparatus.

BACKGROUND

Both common forms of motor used in test apparatus, servo-hydraulic and electromagnetic, comprise output shafts with large masses. Should a fault occur within the apparatus, the large mass can accelerate and cause damage to both the apparatus and any persons in the vicinity. Braking systems are therefore designed to prevent undesired movements of the output shaft.

Servo-hydraulic systems may comprise mechanical brakes whereby the movement of the output shaft is managed by gripping or releasing the output shaft and/or the movement of the output shaft can be managed by controlling the flow of oil in the hydraulic cylinder.

Electromagnetic motors are not operated by the same principles as a servo-hydraulic motor. Instead, an output shaft comprising magnetic material is positioned within a coil assembly, alternatively, moving coil electromagnetic motors mount the coil assembly to the output shaft and positioned within a housing comprising magnetic material. The coil assembly comprises a plurality of separate coil loops, an electric current signal applied through the coil assembly induces a magnetic field which interacts with the magnetic material's magnetic field and therefore a force on the output shaft is generated dependent on the magnitude and direction of the applied current. This force can be used to accelerate or decelerate a moving output shaft, additionally it can be used to counteract gravitational force acting on the output shaft when the test apparatus is in a vertical orientation or any orientation other than horizontal. In a non-horizontal orientation, it will be appreciated that in the absence of electrical power, the output shaft is free to move under the effect of gravity. Therefore, a mechanical brake must be actuated to prevent undesired movement of the output shaft such as when the motor is switched off. An additional means for braking a moving output shaft of an electromagnetic motor is through electromagnetic induction whereby motion of the output shaft within the coil assembly induces eddy currents in the output shaft so as to generate an electromagnetic braking force between the output shaft and the coils otherwise known as an e-brake.

While there is no current standard for compliance which dictates how quickly an output shaft with undesired motion must be arrested, it is desirable that motion be arrested prior to the output shaft travelling 2 mm or less and/or in the case of rotary motors: 360 degrees. Due to the large combined mass of the output shaft, it is possible for the output shaft to travel the length of its travel within a few milliseconds when acting only under gravity. Thus, the response time of the braking system in engaging either the mechanical brake, or reversing the current applied to the coil assembly or applying an e-brake is required to be very short to prevent 2 mm or of travel.

Several known methods for controlling the actuation of the different braking methods involve monitoring the velocity of the output shaft. In an ideal situation, a perfect Safely Limited Speed (SLS) mechanism is used to pre-emptively prevent the output shaft from achieving speeds greater than a predetermined threshold—typically 10 mm/s or 30 deg/s for rotary movement. Unfortunately, current SLS mechanisms are unable to perform this desired function; they operate by monitoring the velocity and raising a fault condition when the threshold is exceeded. Therefore, the velocity of the output shaft has already exceeded the threshold once the fault condition has been raised—the SLS does not pre-emptively limit the speed to avoid exceeding the threshold, it reacts once the threshold is exceeded. This is equivalent to a Safe Speed Monitor (SSM) that monitors velocity and generates a safety and/or fault signal when the velocity is below or above a predetermined threshold, in conjunction with a Safe Torque Off (STO) mechanism that shorts the windings on the coil assembly producing a magnetic braking effect. Similarly, monitoring of the velocity can be extended to monitoring of the acceleration of the output shaft wherein the STO is engaged when a predetermined acceleration threshold is exceeded—typically 30 $mm/s^2$ or 90 $deg/s^2$ for rotary movement.

Several problems exist in relation to the above braking system that uses an SSM in conjunction with an STO to prevent undesired movement. There are scenarios that exist in which the threshold for either velocity or acceleration can be exceeded but a fault has not occurred. These are termed false-triggering events or nuisance tripping. In these scenarios, the braking system engages and the apparatus is made safe until an inspection can be carried out. The frequency at which these false-triggering events occur results in a sizable proportion of operators for test apparatus switching off the emergency braking system; a practice which can lead not only to apparatus damage but also injury to operators.

Examples of scenarios where the threshold for either velocity or acceleration is exceeded but a fault has not occurred include (but are not limited to):

1. Each time the mechanical brake is released, an impulse is experienced by the output shaft resulting in large acceleration and velocity.
2. Working in the environment with the test apparatus, the apparatus can be knocked accidentally, resulting in large acceleration and velocity.
3. Adjusting the load string with tools can result in impulses that produce large acceleration and velocity.
4. Operating the specimen holding grips can result in impulses that produce large acceleration and velocity.
5. When operating in a set-up mode, in which the current applied to the motor is strictly limited, 'motor cogging' can result in the velocity and acceleration thresholds being exceeded.

There is therefore a need to develop an emergency system that has a high accuracy in differentiating false-triggering events from actually undesired output shaft motion.

Conventional means for arresting the motion of an uncontrolled output shaft is the use of an electrical brake: by connecting each of the plurality of the separate coil loops of the coil assembly to each other. To do this, a mechanical device is used; a delay between the instruction to apply the e-brake and the mechanical device enacting the brake results in the time between identifying a failure event and the output shaft being arrested being of the order 10 milliseconds. A delay of this duration is not sufficient to bring the output shaft to rest within 2 mm of travel and as such a new device is required to decrease the distance of travel by reducing the delay time.

Test apparatus must abide by certain safety standards, one such standard involves the lifetime of the mechanical brake pads used in each mechanical brake. It is therefore desired to produce a means for monitoring the lifetime of brake pads fitted to a mechanical brake.

SUMMARY

A first aspect of the present invention relates to a method for controlling the braking system of an electromagnetic motor, the electromagnetic motor having a moveable output shaft, comprising the steps of: receiving a velocity signal and/or an acceleration signal based on movement of the output shaft, said velocity signal and/or acceleration signal having a respective frequency spectrum; identifying an event from the velocity and/or the acceleration signal using the respective frequency spectrum, wherein said event corresponds to an uncontrolled movement of the output shaft and has a characteristic frequency spectrum.

Identifying the event comprises filtering the velocity and/or acceleration signal to attenuate one or more frequency components of the frequency spectrum; the one or more frequency components attenuated by the filter can represent a part or a whole of a frequency profile of the uncontrolled movement of the output shaft that does not pose a risk to an operator. As such, the applicant gives a way of distinguishing between previously indistinguishable events.

To reduce the delay between triggering actuation of the electric brake and the actual actuation, the second aspect of the present invention proposes a device comprising: a coil assembly circuit comprising a plurality of separate coil loops configured to cause movement of an output shaft of the motor while electrical power is applied; a switching device configured to form an electrical connection between the plurality of separate coil loops of the coil assembly circuit such that movement of the output shaft is arrested; and an opto-isolator for actuating the switching device. Said device also has the benefit of electrically isolating high voltage circuits from low voltage circuits therefore providing a means for protecting components from damage.

The force acting on the output shaft and therefore, the movement of the output shaft with respect to the coil assembly is dependent on the magnitude and direction of the current applied to the coils in the coil assembly. When the testing machine is turned off, the output shaft can be in any position since the mechanical brake is engaged with the output shaft when the power is turned off. During the initial start-up of the testing machine, i.e. when the testing machine is switched on, there is a sudden jolt as the mechanical brake disengages from the output shaft, i.e. the brake shoe disengages from the output shaft. Such a sudden jolt can be considered as a failure event discussed above with respect to the first aspect of the present invention and detected as an impulse that would trigger a fault condition.

To mitigate the movement of the output shaft when the mechanical brake is released from engagement with the output shaft, e.g. during initial start-up of the testing machine, the third aspect of the present invention suggests a method of correlating the position of the output shaft with a current applied to a coil assembly necessary to resist movement of the output shaft. Preferably, the method comprising the steps of: determining the position of the output shaft; determining a current based on the position of the output shaft that when applied in the coil assembly induces a force on the output shaft to prevent motion of the output shaft when the mechanical brake is released and, applying the current to the coil assembly. Said method can also comprise using a look-up table to determine the current applied to the coil assembly based on the position of the output shaft. To generate said look up table, the current in the coil assembly is sampled at fixed intervals of the axial displacement of the output shaft. Preferably the applicant also proposes the method of: determining a first current needed to hold the output shaft in a first position; determining, a second current needed to hold the output shaft in a second position; storing the first and second positions together with the first current and second current in the look-up table.

The present invention provides, in its fourth aspect, a mechanical brake design that increases the speed of engagement of the brake with the output shaft. Said brake comprises a pivotally mounted plate having a space for receiving the output shaft of the motor; an electrically operated holding device contacting a free end of the plate and arranged to hold the plate in a condition to permit movement of the output shaft and to permit the plate to pivot to a jamming position; wherein the electrically operated holding device comprises a solenoid to control the movement of the plate. The braking action of the mechanical brake of the present invention is self-energising which means that the weight of the output shaft acting downwards under gravity generates the braking force necessary to hold the output shaft in position. The solenoid can be a linear solenoid to provide an advanced actuation mechanism over that known in the prior art. Furthermore, the mechanical brake can comprise a resilient member arranged to bias the plate towards the jamming position. Optionally, the mechanical brake is fabricated as a modular component.

The present invention provides, in its fifth aspect, a method for monitoring the performance of a mechanical brake for a linear electromagnetic motor, the linear motor having a linearly moveable output shaft, comprising monitoring travel of the output shaft over the duration of actuation of the mechanical brake and comparing said travel with a predetermined travel threshold. Said method provides a means to monitor reliability, ensure proper functioning and increase safety of the linear motor. A user can be alerted to the degree of travel so that they can take appropriate actions.

In some situations, the mechanical brake of the fourth aspect of the present invention may fail to engage for a variety of reasons. For example, the solenoid of the mechanical brake may fail or is jammed due to a fault in the electrical switching which fails to remove the power to the solenoid holding the elongated plate in the released condition and thereby, preventing the elongated plate to engage with the output shaft or the brake shoe of the mechanical brake fails to engage with the output shaft, e.g. worn out. In an event of failure of the mechanical brake and to prevent the output shaft from falling and creating a crushing force, in a sixth aspect of the present invention, the present invention provides a redundant mechanical brake. Preferably, the mechanical brake of the present invention comprises a primary mechanical brake and a secondary (redundant) mechanical brake. The mechanical brake discussed above being the primary mechanical brake and wherein the mechanical brake further comprises a secondary mechanical brake. The secondary mechanical brake behaves similarly to the primary mechanical brake of the present invention, i.e. comprising a pivotally mounted elongated plate having a space for receiving the output shaft and which engages with the output shaft when in the brake "on" condition and an electrically operated holding device to control the movement of a pivotally mounted second plate. To accommodate both the primary mechanical brake and the secondary mechanical brake, the primary mechanical brake may be rotationally offset to the secondary mechanical brake about the longitudinal axis of the output shaft such that their respective plates pivot about non-parallel axes. The secondary mechanical brake cooperates with the primary mechanical brake to provide the functional features of the mechanical brake discussed above. Preferably, the primary mechanical brake comprises a pivotally mounted first plate and the secondary mechanical brake comprises a pivotally mounted second plate, each of the pivotally mounted first and second plate comprises a space that are co-axial for receiving the output shaft of the motor, wherein the secondary mechanical brake cooperates with the primary mechanical brake to provide a stop spaced apart from a lower surface of the second plate and arranged to contact the lower surface of the second plate when a force acting on the second plate by the output shaft exceeds a threshold. Preferably, the electrically operated holding device (e.g. solenoid) of the secondary mechanical brake is coupled to the pivotally mounted first plate of the primary mechanical brake such that the electrically operated holding device of the secondary mechanical brake rides on the pivotally mounted first plate. More preferably, the pivotally mounted second plate is pivotally mounted on a resiliently loaded (or supported) fulcrum which is capable of movement when the force acting on the second plate by the output shaft exceeds the threshold such that the second plate pivots about the stop and overcomes the biasing force of the resilient member, wherein the resiliently loaded (or supported) fulcrum is provided by the cooperation of the secondary mechanical brake with the primary mechanical brake.

Preferably, in use, the pivotally mounted first plate of the first mechanical brake and the pivotally mounted second plate of the second mechanical brake are arranged to pivot independently in sequence or simultaneously. The first mechanical brake and the second mechanical brake act in parallel to arrest the movement of the output shaft. In normal braking, both the pivotally mounted first plate and the pivotally mounted second plate pivot to engage with the output shaft, more specifically the spacing for receiving the output shaft engages with the output shaft. There are two conditions of engagement of the mechanical brake with the output shaft. The first is "arming" of the mechanical brake and represents the condition whereby the mechanical brake is not or not entirely loaded by the weight of the output shaft and therefore, the elongated plated, more specifically the spacing for receiving the output shaft is not jammed against the output shaft. The second condition is full braking and occurs when the mechanical brake becomes loaded as the weight of the output shaft causes the spacing for receiving the output shaft to jam further against the output shaft to take up the load of the output shaft as the plate tilts. Optionally, the load to hold the output shaft is shared between the primary mechanical brake and the secondary mechanical brake. Preferably, the primary mechanical brake takes more of the share of the load of the output shaft than the secondary mechanical brake in the normal braking condition. Preferably, in the normal braking condition, the primary mechanical brake is loaded, i.e. takes the load of the output shaft and the secondary mechanical brake is armed. By arming the secondary mechanical brake whilst the primary mechanical brake shares a greater portion of the load of the output shaft, preserves the brake shoe of the secondary mechanical brake and therefore, there is less likelihood that the brake shoe of the secondary mechanical brake will wear out before the brake shoe of the primary mechanical brake. Thus, should the primary mechanical brake fail, the brake shoe of the secondary mechanical brake would still be in a condition to take up the load of the output shaft without excessive slipping.

Preferably, the pivotally mounted first plate of the primary mechanical brake pivots at a greater angle with respect to the horizontal axis than the pivotally mounted second plate of the secondary mechanical brake in the normal braking condition. By allowing the pivotally mounted second plate to pivot further than the pivotally mounted first plate, the pivotally mounted first plate will engage with the output shaft a fraction of a second earlier than the pivotally mounted second plate with the resultant effect that the primary mechanical brake will share a greater portion or all of the load of the output shaft than the secondary mechanical brake which will be in the armed condition. The secondary mechanical brake will become more loaded, i.e. out of the armed condition, when the primary mechanical starts to fail. The lesser the amount of load of the output shaft that is supported by the primary mechanical brake, i.e. the lesser it engages with the output shaft, the greater the share of the load of the output shaft is taken up by the secondary mechanical brake (and vice-versa) and thereby, providing additional safety.

Each aspect of the present invention can be combined with any other aspect, as can each option within each aspect; unless they are specifically taught as alternatives. The different aspects of the invention individually or in any combination provide an improved test apparatus.

BRIEF DESCRIPTION OF THE DRAWINGS

Further preferred features and aspects of the present invention will be apparent from the claims and the following illustrative description made with reference to the accompanying drawings in which:

DETAILED DESCRIPTION

The present invention has, as an object, the provision of a construction of a braking system for an actuator comprising an electromagnetic motor as well as methods for the actuation thereof by a control system. Whilst the below description is given in reference to a vertically orientated test apparatus, the present invention is not so limited and may be incorporated to another system requiring the effects offered thereby.

The control system and braking system may be incorporated into a conventional test apparatus comprising an actuator comprising an electromagnetic motor comprising an output shaft moveably positioned within a coil assembly. Alternatively, the electromagnetic motor may comprise a coil assembly mounted to an output shaft, the output shaft positioned within a housing comprising magnetic material (known as a moving coil motor). The coil assembly comprising a coil assembly circuit arranged such that the motor is a multi-phase motor. In the option of the present invention described herein, the motor is a three-phase motor configured to produce linear and/or rotary movement of the output shaft. The actuator comprising the motor comprises one or more displacement sensors for determining a displacement of the output shaft within the coil assembly and an encoder for calculating the displacement of the output shaft as a function of time. Examples of displacement sensors include but are not limited to LVDT (linear variable differential transformer); strain gauges and rotary potentiometers. The encoder having a sampling frequency, the sampling frequency may be fixed or controllable such that the sampling frequency is between 1 kHz and 20 kHz. Alternatively, displacement of the output shaft may be determined through measurement of the velocity and/or acceleration of the output shaft and subsequent integration to find displacement. An example of a device for measuring the velocity is a velocity transducer. An example of a device for measuring acceleration is an accelerometer. These devices can be included in the actuator using any known method e.g. incorporation into the output shaft. Further alternatively, displacement of the output shaft may be determined through differentiation of a measurement of the absement of the output shaft and subsequent differentiations to find velocity and/or acceleration.

The object of the first aspect of the present invention is to produce a control system capable of differentiating between different movements of the output shaft such that the control system arrests the movement of the output shaft when a failure event occurs, a failure event being an uncontrolled (unauthorised, uninstructed etc.) movement of the output shaft caused by a failure of a component of the linear motor.

Figure 1:
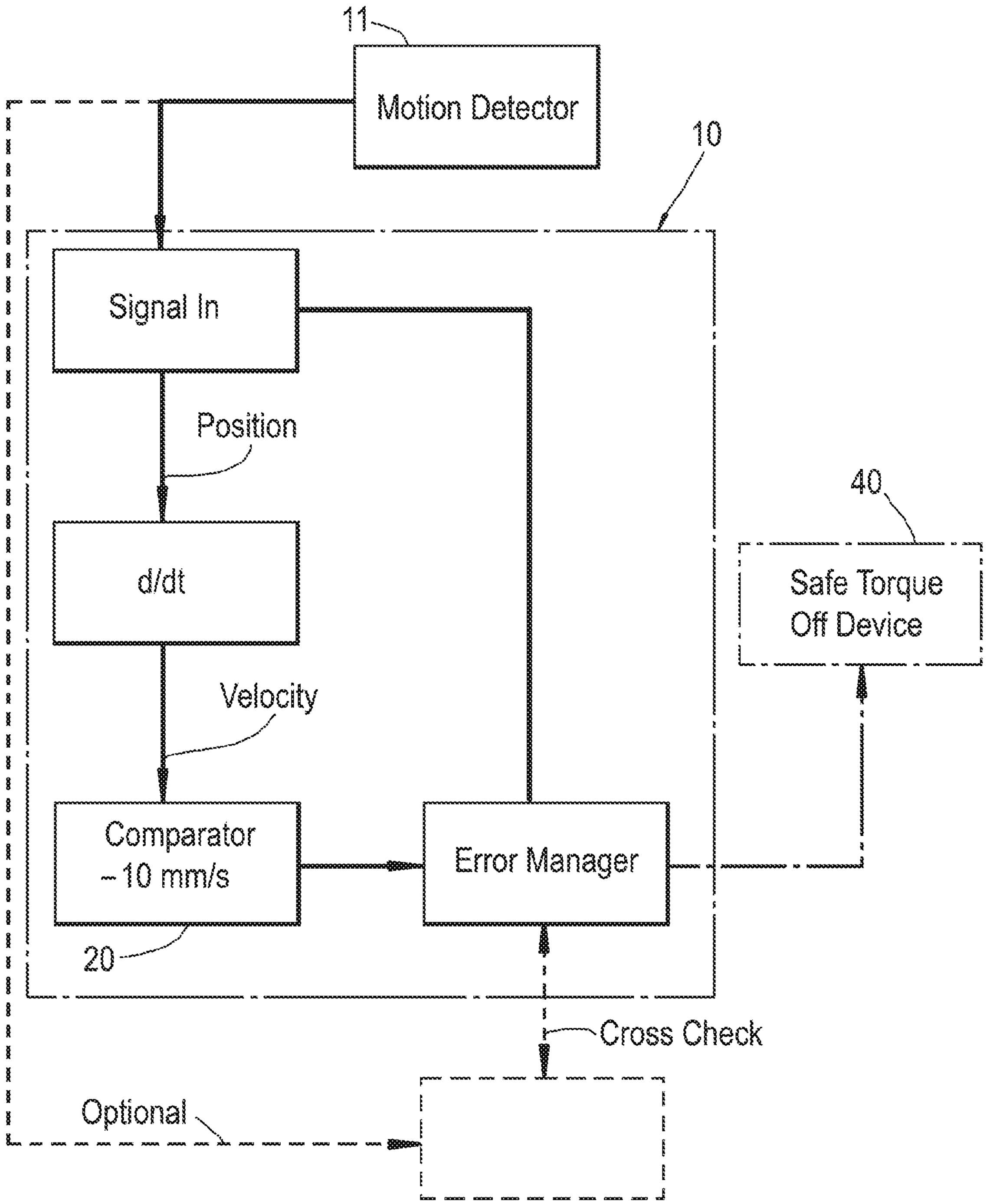
FIG. 1 is a flow chart representation of an electromagnetic motor control system known in the prior art.

As discussed in the introduction, there exist several events which result in a conventional control system arresting the movement of the output shaft. A conventional control system is configured to determine when a velocity of the output shaft (calculated by a motion detector 11) exceeds a predetermined threshold using the displacement measured by a displacement sensor as a function of time. To achieve this, a conventional SSM 10 as shown in FIG. 1 comprises at least one comparator 20 adapted to compare the velocity of the output shaft with a predetermined velocity threshold, for instance 10 mm/s for linear movement and/or 30 deg/s for rotary movement. The velocity signal may be determined through differentiation of a displacement signal, integration of an acceleration signal, or by measurement using a velocity detector. When said predetermined velocity threshold is exceeded, an output of the comparator triggers a Safe Torque Off (STO) device 40 which activates a braking device. Additionally, the conventional SSM may also comprise another at least one comparator adapted to compare the acceleration of the output shaft with a predetermined acceleration threshold (for instance 30 mm/s for linear movement and/or 90 deg/s for rotary movement) and trigger the STO device, in addition to or as an alternative to the velocity comparator.

The predetermined velocity and/or acceleration thresholds may be exceeded by several events. These events include but are not limited to those discussed in the introduction and repeated below:

1. An impulse is experienced by the output shaft resulting in a momentary large acceleration and velocity when the mechanical brake is disengaged.
2. Working in the environment with the test apparatus, the apparatus can be knocked accidentally, resulting in large acceleration and velocity.
3. Adjusting the load string with tools can result in impulses that produce large acceleration and velocity.
4. Operating the specimen holding grips can result in impulses that produce large acceleration and velocity.
5. When operating in a set-up mode, in which the current applied to the motor is strictly limited, 'motor cogging' can result in the velocity and acceleration thresholds being exceeded.
6. The uncontrolled movement of the output shaft as a result of a failure of a component of the test apparatus or any other event which poses a risk to an operator said risks include but are not limited to: entanglement, friction or abrasion, cutting, shearing, stabbing or puncture, impacting, crushing, or drawing-in. Wherein an uncontrolled movement beyond a predetermined movement threshold corresponds to a risk to the operator. The predetermined movement threshold for linear movement is optionally in the range 0 mm to 200 mm, or 0 mm to 60 mm. In an option of the present invention, the threshold is 2 mm. For rotary movement the predetermined movement threshold is optionally in the range 0 degrees to 30 degrees.

Events 1-5 are known as false-failure events, not caused by component failure and/or without presenting a risk to operators, as opposed to event 6 which is a true failure event.

The applicant identified that there is a need to differentiate between the different events when the test apparatus is operating such that the frequency of occurrences when the STO device is triggered is reduced i.e. only triggered by a (true) failure event and not by a false-failure event. Therefore, leading to a lower probability of an operator switching off the control system when dissatisfied by the high frequency of occurrences (false-failures).

In the present invention, the applicant noted that if a signal representing the velocity or acceleration of the output shaft is broken down into discrete periods of time, analysing the frequency spectrum of each period can be used to identify and differentiate between the events which cannot be differentiated by using conventional comparator methods involving examining only the velocity and/or acceleration in time signal. Fourier transform is one example in the present invention to provide a frequency domain representation of the signal representing either the velocity or acceleration of the output shaft.

As such, according to a first aspect of the present invention, a control system for controlling a braking system is provided. The control system and braking system may be incorporated into test apparatus comprising actuator comprising an electromagnetic motor comprising an output shaft moveably positioned within a coil assembly. A moving coil motor is not excluded from the scope of the invention. The braking system comprises a means for generating a signal based on the movement of the output shaft. For the purpose of explanation of the present invention, such a means is generally known as a linear and/or rotary motion detector 111. In an option of the present invention, the motion detector comprises one or more displacement sensors for determining the displacement of the output shaft within the coil assembly and an encoder for producing the displacement of the output shaft as a function of time. The encoder having a sampling frequency, the sampling frequency may be fixed or controllable such that the sampling frequency is between 1 kHz and 20 kHz. In an option of the first aspect of the present invention the encoder has a sampling frequency of 10 kHz. In an option of the present invention, the velocity of the output shaft can be determined using a velocity transducer. In another option of the present invention, the motion detector comprises an acceleration detector, such as an accelerometer. In another option of the present invention, the linear and/or rotary motion detector comprises at least one of: a displacement detector, a velocity detector or an acceleration detector.

The control system, according to the first aspect of the present invention, comprises a safe speed monitor (SSM) 110 configured to identify an uncontrolled movement of the output shaft using the frequency spectrum of the velocity and/or acceleration signal. The SSM is configured to receive an input signal from the motion detector 111 chosen from at least one of the displacement detector, the velocity detector or the acceleration detector whose signals correspond to the motion of the output shaft. The SSM may additionally be configured to determine a velocity signal and/or an acceleration signal corresponding to the velocity and/or acceleration of the output shaft based on the input signal being any one of: the displacement, the velocity or the acceleration of the output shaft.

Figure 2:
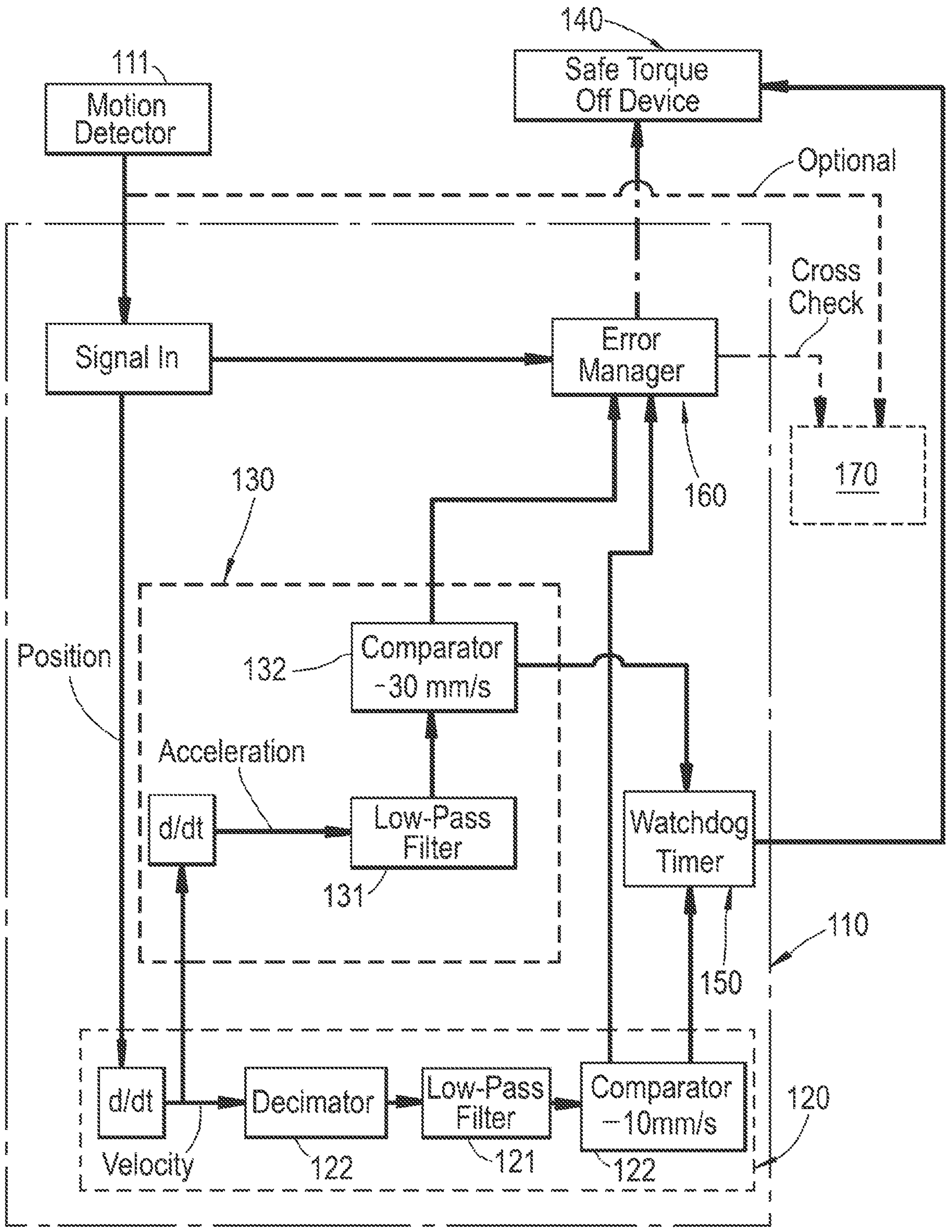
FIG. 2 is a flow chart representation of an electromagnetic motor control system according to a first aspect of the present invention.

FIG. 2 represents an option of the present invention wherein the motion detector comprises a displacement detector, the SSM is configured to determine the velocity signal and/or acceleration signal corresponding to the motion of the output shaft based on the displacement by differentiating the signal with respect to time (d/dt).

The control system as shown in FIG. 2 comprises a first channel 120 comprising a first filter 121 for attenuating one or more frequency components of the velocity signal. In an option of the first aspect of the present invention, the first filter is a finite impulse response (FIR) filter. Whilst the present invention does not wish to exclude the provision of the first filter being a software filter, a delay in the processing of the signal between receiving the output of the displacement detector and applying the first filter as a software filter using components available at prices suitable for inclusion in a commercially saleable product is not short enough to satisfactorily limit the movement of the output shaft. As discussed above, a software filter would make use of a mathematical operation whereby a frequency domain representation of the velocity signal is calculated, e.g. Fourier transform, specific frequencies would then be attenuated. The present invention therefore acknowledges that some software filters may be suitable for the present purpose but are not practicable in relation to commercial requirements. Furthermore, within software filters there are more opportunities for errors or faults to be present leading to a reduction in safety and an increase in production and maintenance costs. Therefore, in an option of the present invention, the first filter is implemented in hardware as an analogue or a digital filter.

As shown in FIG. 2, an option of the first aspect of the present invention can include a second channel 130 comprising a second filter 131 for modifying the acceleration signal by attenuating one or more frequency components of the acceleration signal in the frequency domain. In a further option, the second filter may be a finite impulse response (FIR) filter. As with the first filter, the second filter may be implemented in software or in hardware. The reader should be aware that the first aspect of the present invention, whilst described with both the first and second channels, could be implemented with only one of the first or second channels, i.e. only the velocity signal or the acceleration signal is modified by a filter.

The following description of the first or second filters uses a FIR filter as an example, however any other form of filter that produces the desired signal attenuation may be implemented. A typical FIR filter comprises a delay line having N stages, each stage having a predetermined coefficient. The selection of the number of stages and their respective coefficients is dependent on the desired functional requirement of the filter. The choice of coefficients for each stage will affect the function or 'shape' of the filter, i.e. whether it is a low-pass filter, a band-filter or high-pass filter. Increasing the number of stages will increase the delay between receiving the output of the encoder and outputting a signal from the filter; however, it will increase the precision of discrimination of the filter.

Figure 3A:
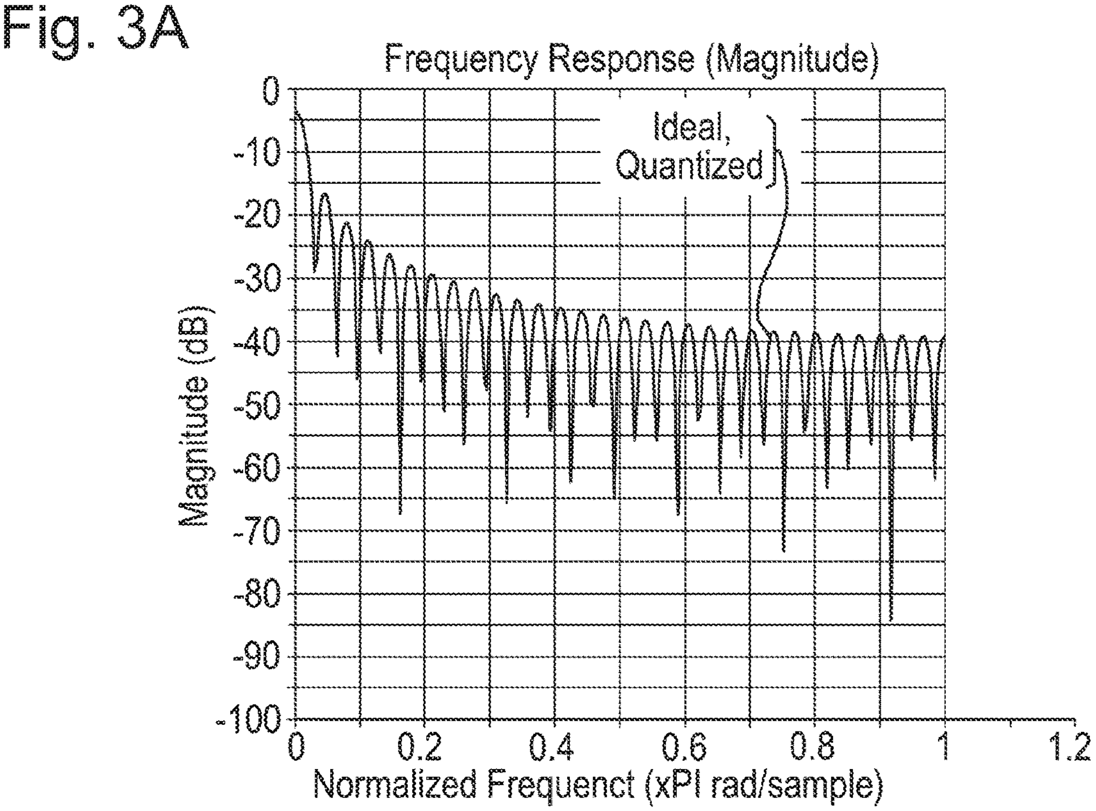
FIG. 3A is plot of the frequency response of the FIR filter on the first channel according to an option of the first aspect of the present invention.
Figure 3B:
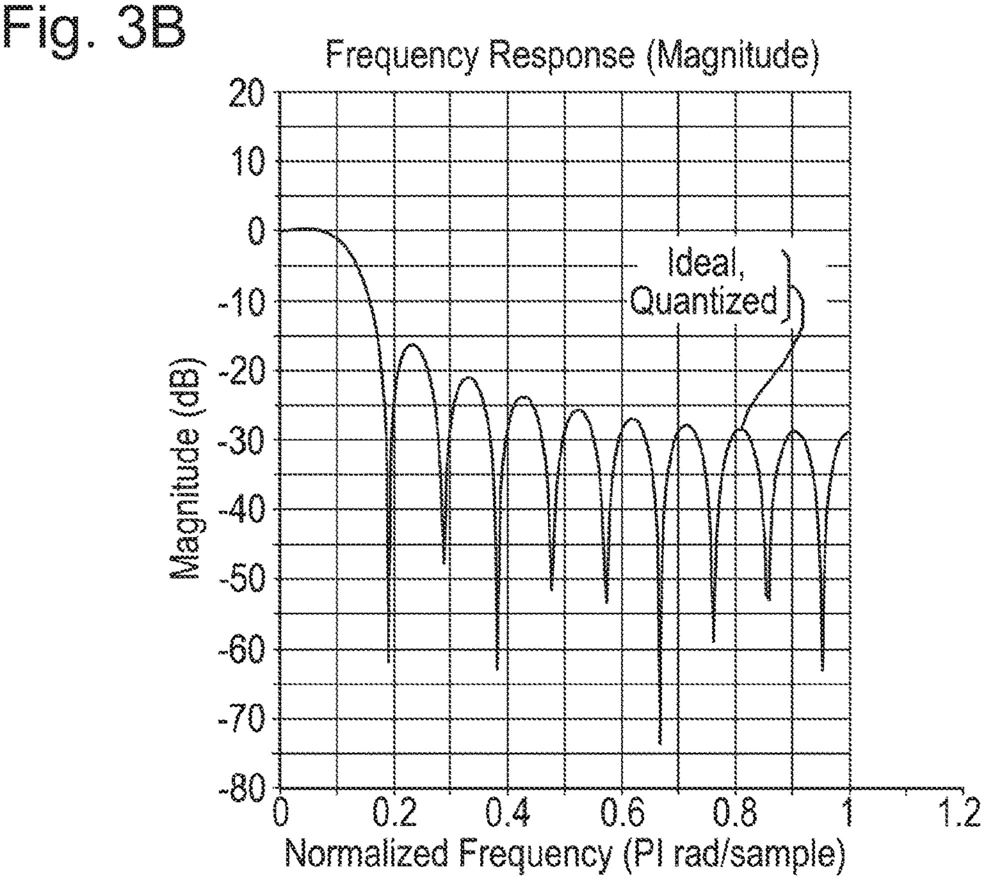
FIG. 3B is plot of the frequency response of the FIR filter on the second channel according to an option of the first aspect of the present invention.

In analysing the frequency spectrum of each occurrence that causes a failure event or false-failure event, it can be noted that the frequency spectrum of failure events is substantially lower than that of the false-failure event which occur momentarily. By designing an ideal low-pass filter, equating to the characteristic frequency spectrum of a failure event, it is therefore possible to filter out the false-failure events such that these events do not result in the triggering of the STO device. To determine the parameters of the ideal low-pass filter, an average characteristic frequency spectrum of several failure events can be determined computationally or by hand-calculation. Once determined, the ideal lowpass-filter is chosen such that the filter will remove all false-failure events—by attenuating frequency components in the velocity and/or acceleration signals present in the frequency spectrum due to false-failure events—but still capable of detecting outlier failure events. An outlier failure event being one with frequency spectrum that is statistically unlikely. An example of the frequency response of an ideal filter for the first filter is shown in FIG. 3A and an example of the frequency response of an ideal filter for the second filter is shown in FIG. 3B.

A compromise must be made between the precision of the discrimination of the filter and the delay introduced as the number of stages of the filter increases. In an option of the present invention, the second low-pass filter is chosen to have 20 stages and therefore 21 coefficients. In a further option, the first low-pass filter is chosen to have 60 stages and therefore 61 coefficients. The number of stages within the second filter is chosen to be less than the number of stages of the first filter to reduce the reaction time of the control system. The sooner a failure event is detected the less momentum is built up and the less risk presented to the operator. In an alternative option of the first aspect of the present invention, each filter may have any number of stages and coefficients or alternatively the second filter may have more stages than the first filter.

The result of the application of the first and/or second filter, to the filtered velocity or acceleration signal respectively, is that only true failure events can result in the arresting of the output shaft by triggering a STO device 140. The filtered velocity signal, having been either passed without attenuation or with attenuation by the filter, is transmitted to a first comparator 122 on the first channel configured compare the filtered velocity signal with a predetermined velocity threshold. This is implemented similarly by a second comparator 132 on the second channel with the filtered acceleration signal and a predetermined acceleration threshold. An option of the first aspect of the present invention has the predetermined velocity threshold at about 10 mm/s for linear movement and at about 30 deg/s (for example 29.8 deg/s) for rotary movement and the predetermined acceleration threshold at about 30 mm/s$^2$ for linear movement and at about 90 deg/s$^2$ (for example 89.4 deg/s$^2$) for rotary movement. Any other values may be chosen and are not outside the scope of the present description, other values are chosen in order to change the sensitivity of the SSM; for instance the predetermined velocity threshold is optionally in the range 0 mm/s to 100 mm/s for linear movement and/or 0 deg/s to 360 deg/s for rotary movement; and/or the predetermined acceleration threshold is optionally in the range 0 mm/s$^2$ to 500 mm/s$^2$ for linear movement and/or 0 deg/s$^2$ to 1000 deg/s$^2$ for rotary movement.

The result of the identification by the first and/or second comparators of the filtered signals is that the STO device is only triggered if a failure event occurs.

Figure 4:
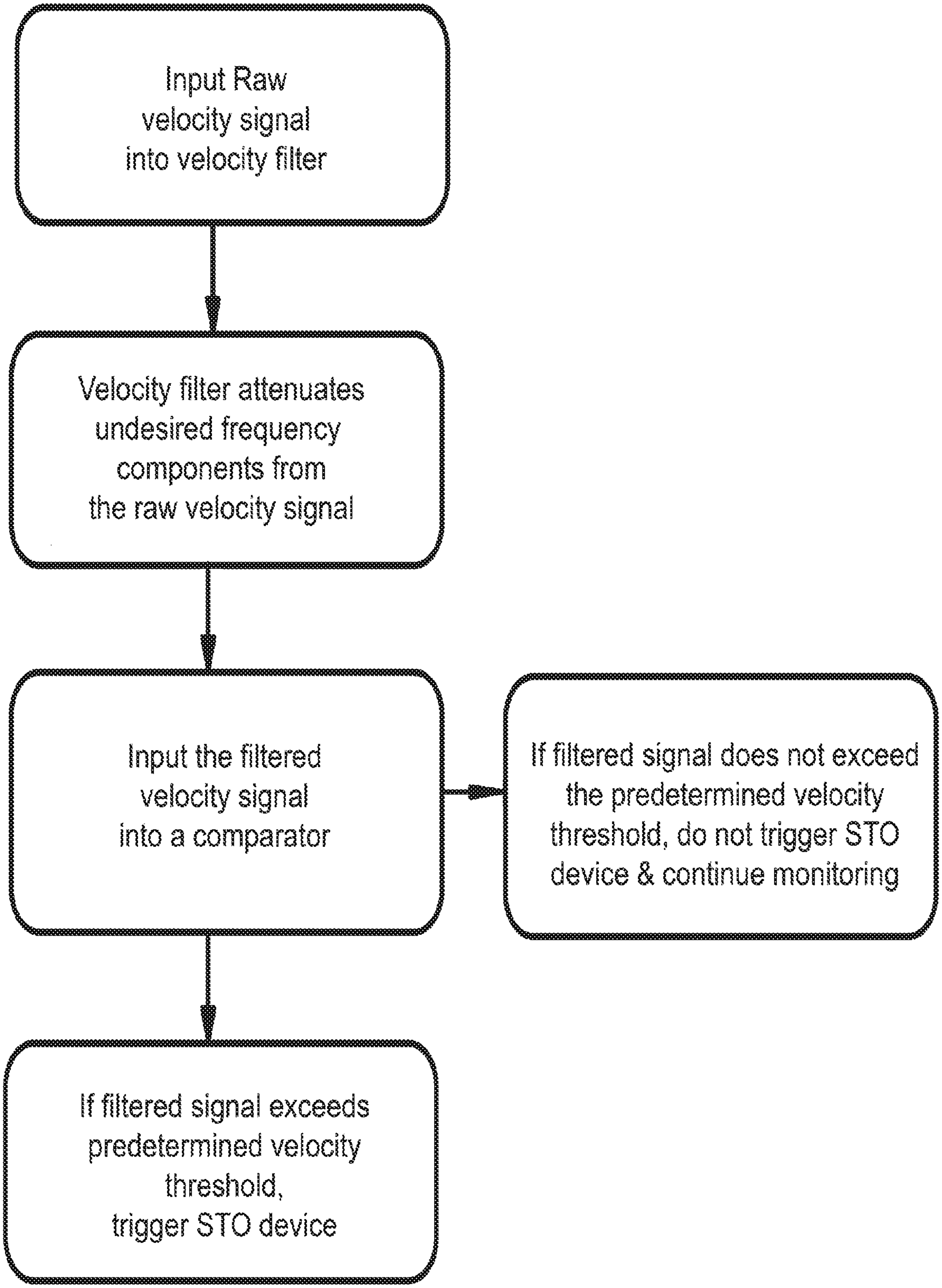
FIG. 4 is a flow chart representation of analysis of motion of the output shaft according to an option of the first aspect of the present invention.
Figure 5A:
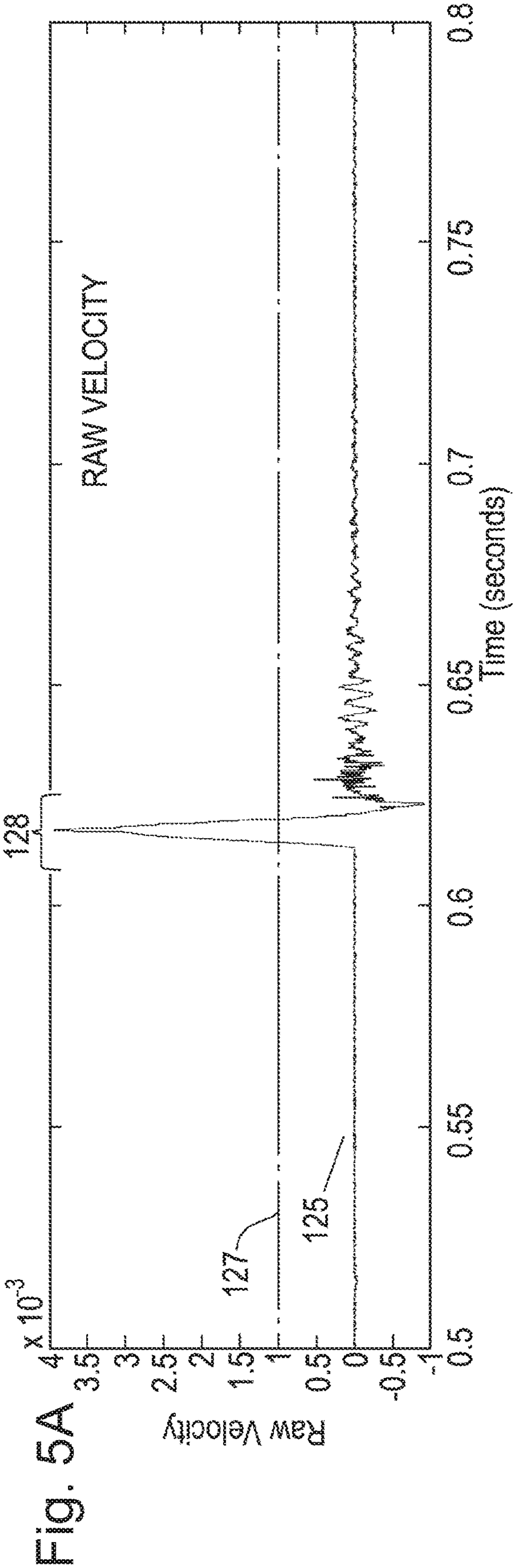
FIGS. 5A and 5B are illustrative graphic plots of the raw velocity signal and filtered velocity signal against time respectively according to an option of the first aspect of the present invention.
Figure 5B:
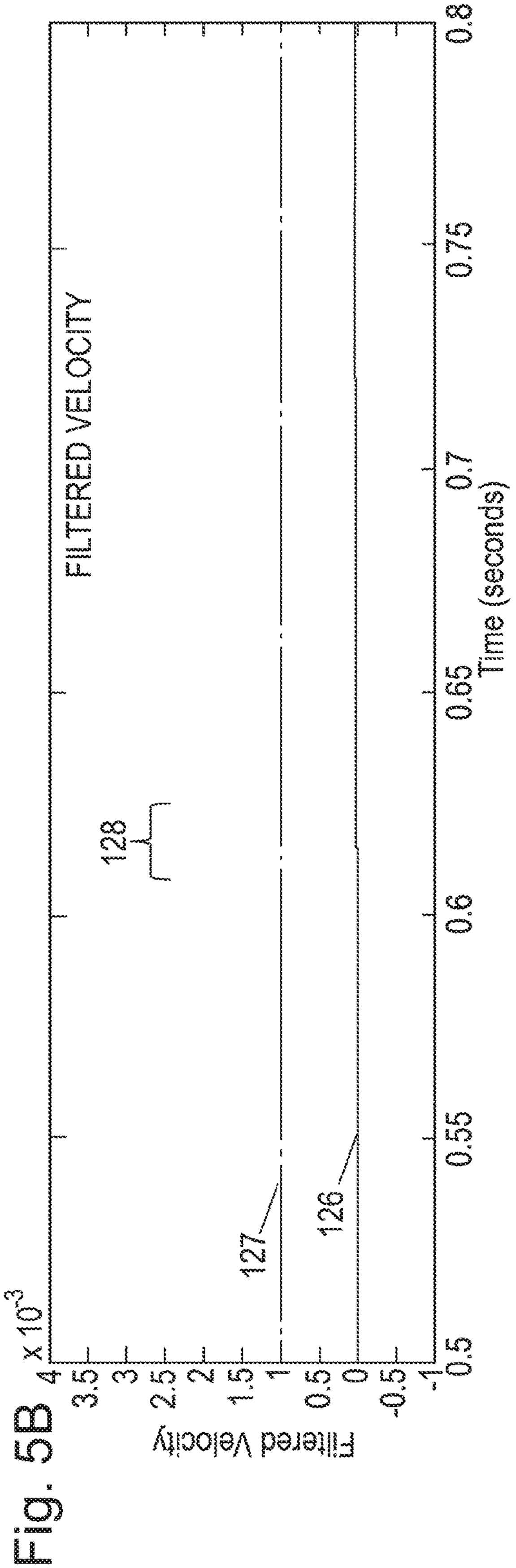
Figure 5C:
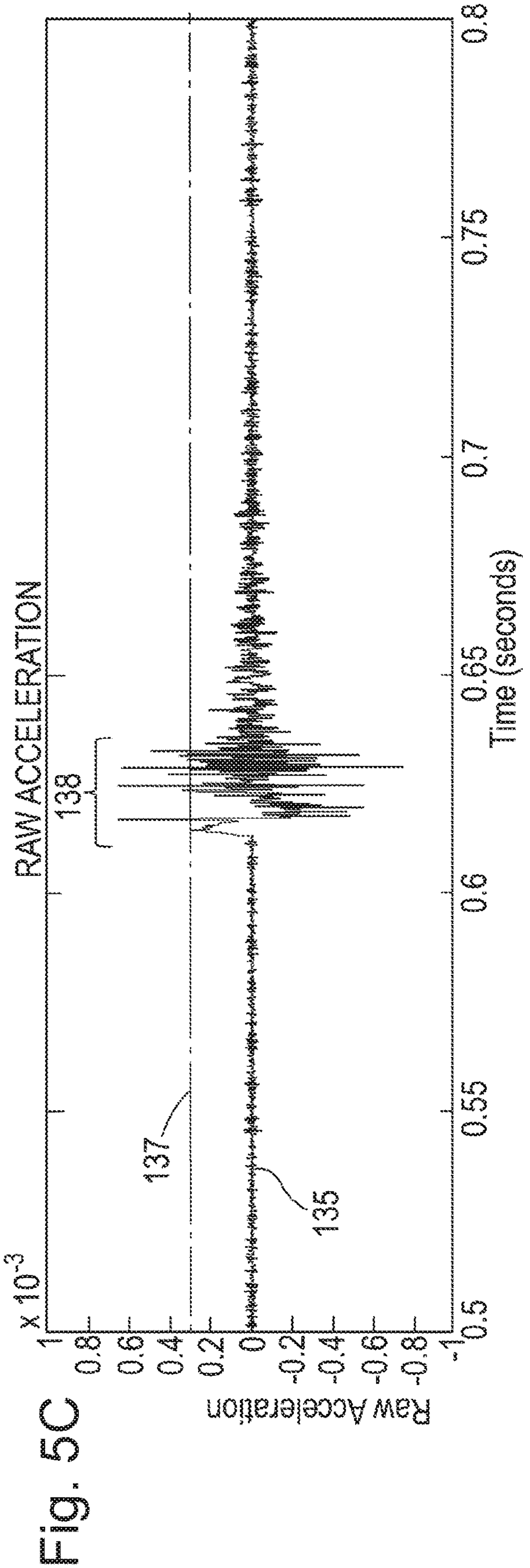
FIGS. 5C and 5D are illustrative graphic plots of the raw acceleration signal and filtered acceleration signal against time respectively according to an option of the first aspect of the present invention.
Figure 5D:
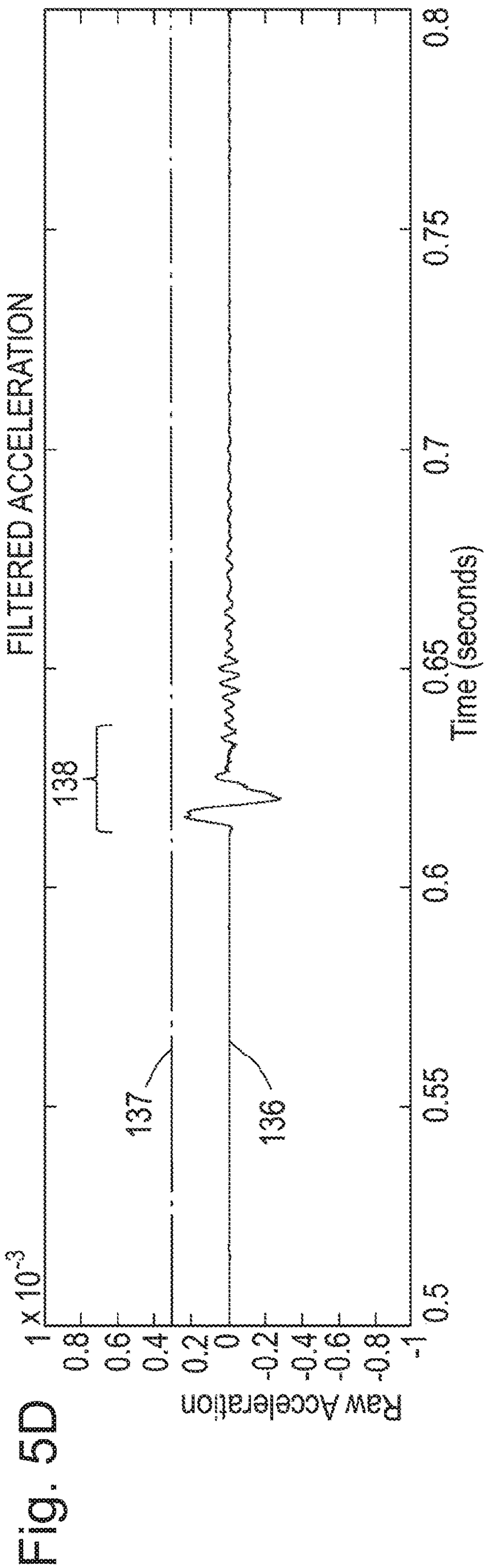

Expressed alternatively with reference to the flow diagram of FIG. 4 and the graphs of FIGS. 5A & 5B: a raw velocity signal 125 corresponding to the velocity of the output shaft is input to a filter, the filter is configured to attenuate frequency components of the velocity signal that are due to false-failure events. Therefore, the filter is tailored such that frequency components within a characteristic frequency spectrum, corresponding to failure events, are not attenuated and those not within the spectrum are attenuated; this profile is known as a predetermined frequency profile. The filtered signal 126 is then input into a comparator, comparing the amplitude of the velocity signal with a predetermined velocity threshold 127. If the predetermined velocity threshold is exceeded, the STO device is triggered and the output shaft is arrested. The same method can be applied equally to an acceleration signal corresponding to the acceleration of the output shaft as shown in FIGS. 5C & 5D, wherein references 135, 136 and 137 correspond to the raw acceleration signal, filtered acceleration signal and the predetermined acceleration threshold respectively. As can be seen from FIGS. 5A and 5C the raw velocity and acceleration signals—in particular peaks 128 and 138—would result in the trigger of the STO device for a traditional SSM, however, following filtering to remove false-failure events from the raw signals, the STO is not triggered when the comparison with the requisite thresholds is performed using the filtered signals i.e. the peaks in acceleration and velocity no longer exceed the predetermined thresholds.

The first and/or second channel may each comprise a decimator. FIG. 2 shows an option of the first aspect of the present invention in which the first channel comprises a decimator 123, converting the frequency of the input velocity signal from the sampling frequency of 10 kHz to about 200 Hz. It should be understood that the decimator may reduce the input signal frequency to any chosen frequency. Decimation is performed in order that a filter is sufficiently discriminatory; to ensure this the sample frequency of the input velocity or acceleration signals should be close to a corner frequency of the filter.

In a further option of the first aspect of the present invention, signals from the SSM are fed into a watchdog timer 150. The watchdog timer can be configured to determine component failure within the SSM. During normal operation, the watchdog timer monitors the signals within the SSM, should the watchdog detect a fault, e.g. if the signal fails to propagate through the SSM to the watchdog timer, the watchdog timer generates a timeout signal which triggers actuation of the STO. The watchdog timer can be configured to receive inputs corresponding to the input or outputs of the components within the SSM and/or from the motion detectors. In a chosen option of the present invention shown in FIG. 2, the watchdog timer is configured to receive an input from the SSM, after the velocity and/or acceleration signals have been filtered as they enter the comparator such that performance of the filters can be monitored. In an option of the present invention, the input to the watchdog timer is the filter velocity and/or acceleration signal, if the watchdog does not receive the input within a predetermined time-period since the last input was received, the STO is triggered.

In an option of the first aspect of the present invention, a second SSM 170, identical to the first SSM, shares and is communicatively coupled to the STO device and the displacement detector to provide redundancy, via a cross check, in case of component failure in either the first or second SSM and/or to ensure accurate actuation of the STO device. The first and second SSM independently determine if the input signal comprises a failure event.

In an option of the present invention, if the outputs of the first and second SSM do not equate, within the cross check, that a failure event has occurred, the STO will not trigger the braking systems. Alternatively, the STO will trigger the braking systems regardless of whether the SSM' outputs equate, an error is then flagged so that the operator can be made aware of a possible fault in one of the SSMs.

In another option of the first aspect of the present invention, the SSM comprises an error manager 160, the error manager configured to optionally receive inputs from at least one of the first channel, the second channel and the motion detector(s). The error manager generates a signal for delivery to a user, identifying which component or signal of the control system is responsible for triggering the STO device. For instance, if the filtered acceleration signal exceeds the acceleration threshold, the error manager will generate a signal representing that the acceleration threshold has been exceeded. In the instance where one or more components of the control system trigger the STO device, the error manager can generate a signal representing such an event. In an option of the present invention comprising the cross check and the first and second SSM, the SSMs may share an error manager, or each may comprise a separate error manager.

While the object of the first aspect of the present invention is to produce a control system that increases the accuracy with which failure events are identified, the second aspect of the present invention has the object of increasing the speed with which, once an event is identified as a failure event, the output shaft is arrested.

Figure 6A:
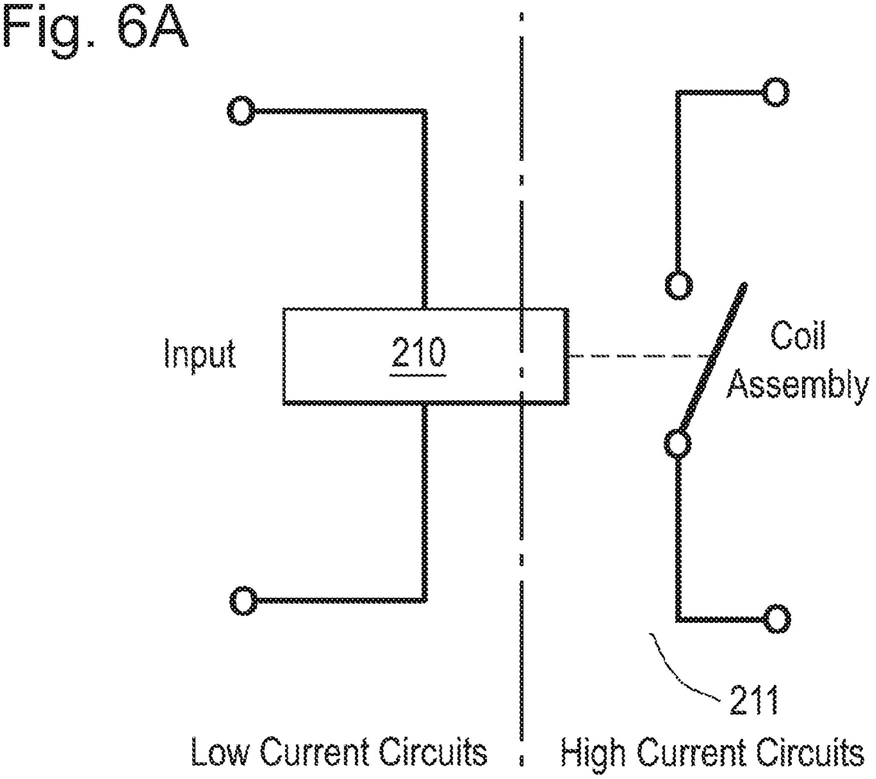
FIG. 6A is a circuit diagram of a mechanical relay switch known in the prior art.

As discussed in the introduction and shown in FIG. 6A, conventionally an STO device comprising a mechanical relay 210 is used to connect each of a plurality separate coil loops of the coil assembly to each other such that the current induced in the shaft generates a Lorentz force sufficient to arrest the shaft. The mechanical relay comprises an electromagnetic coil, controlled by the SSM, used to open and close an electrical circuit 211 for which the coil assembly is connected to. Use of the mechanical relay is chosen for its extended lifetime and reliability in function throughout. However, current mechanical devices are unable to connect the separate coil loops of the coil assembly in sufficient time to comply with stopping the output shaft before the maximum distance that the shaft can travel, e.g. 200 mm for linear movement and 360 degrees for rotary movement.

The voltage used to drive the electric motor are necessarily high in order that the magnetic field generated in the coils produces a sufficient Lorentz force on the output shaft. A mechanical switch is traditionally used to remove the isolation between the separate coil loops such that this high voltage is not able to damage low voltage components of the STO and SSM.

To reduce the delay between decision to arrest and the output shaft coming to rest, the second aspect of the present invention comprises an STO device having a solid-state relay (SSR) circuit switch 220.

Figure 6B:
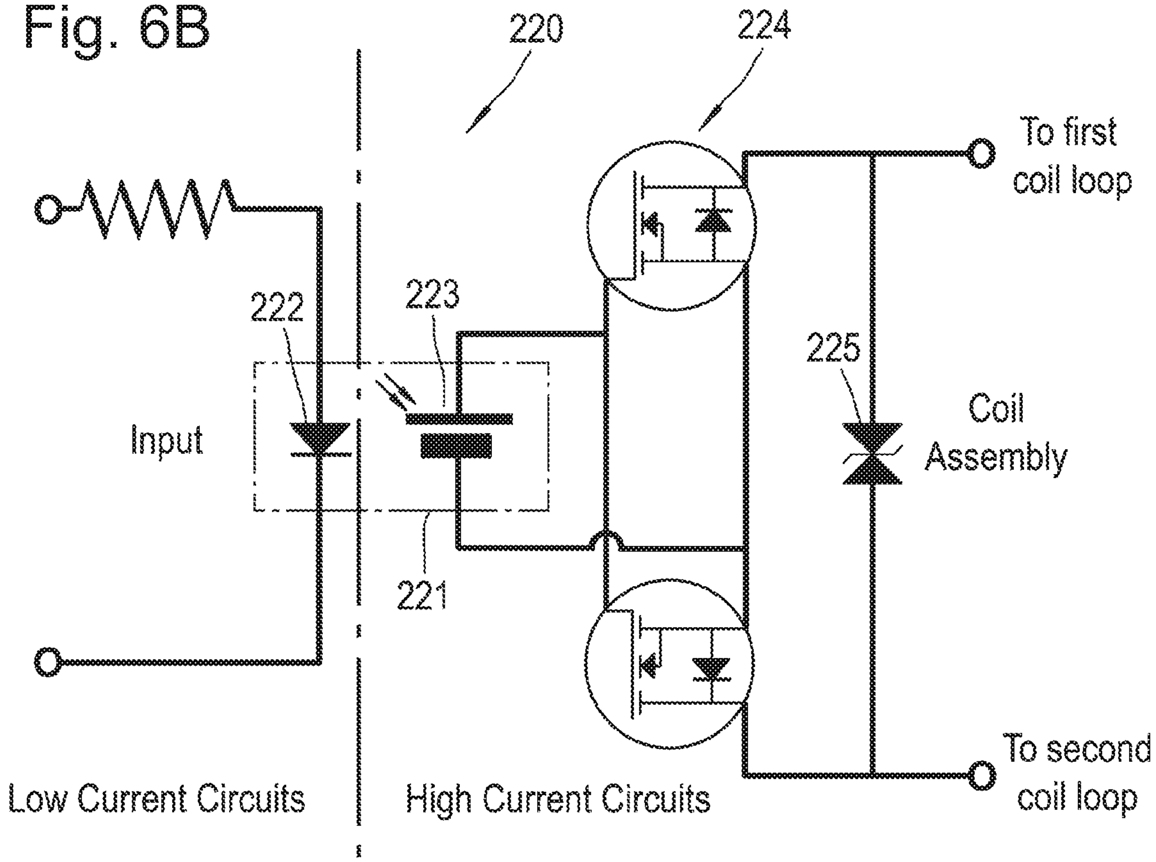
FIGS. 6B and 6C are circuit diagrams of Solid-State-Relay circuit switches according to a second aspect of the present invention.

The solid-state relay circuit switch optionally comprises a back-to-back MOSFET 224 design as shown in FIG. 6B; FIG. 6B represents an STO device for a coil assembly comprising two separate coil loops. Under normal operation, i.e. when the STO device is not triggered, each of the plurality of separate coil loops is isolated. An SSR circuit is positioned between the each of the plurality of separate coil loops, such that when the STO device receives an instruction input from the SSM to arrest motion of the output shaft, the SSR circuit is switched from an 'off' configuration to an 'on' configuration, and current can flow through the right-hand side of the SSR circuit therefore removing the isolation between the loops.

In an option of the second aspect of the present invention, the problem of high voltages within the coil assembly is overcome through the inclusion of an opto-isolator 221. The opto-isolator enables the SSR circuit to be switched without exposing the low voltage circuit to high voltages from the coil assembly by isolating the circuits. The opto-isolator comprises a light emitting diode LED 222 and a photovoltaic cell 223. On instruction to arrest the output shaft, a supply current activates the LED, emitted light is detected by the photocell, and within the back to back MOSFET circuit the SSR circuit is completed as current can flow, therefore connecting the separate coil loops and providing a braking effect. The supply voltage, the LED, photovoltaic cell and parameters of the MOSFET transistors are chosen such that the switching time of the SSR circuit is minimised.

In an effort to further minimise the risk of component damage due to exposure to high voltage, the SSR circuit is connected to the coil assembly via a protection means 225. These protection means can comprise fuses, or in an option of the present invention, a Transient Voltage Suppressor (TVS) Diode such that in the case of high voltage (beyond those expected in normal operation) the MOSFET transistors are protected.

Figure 6C:
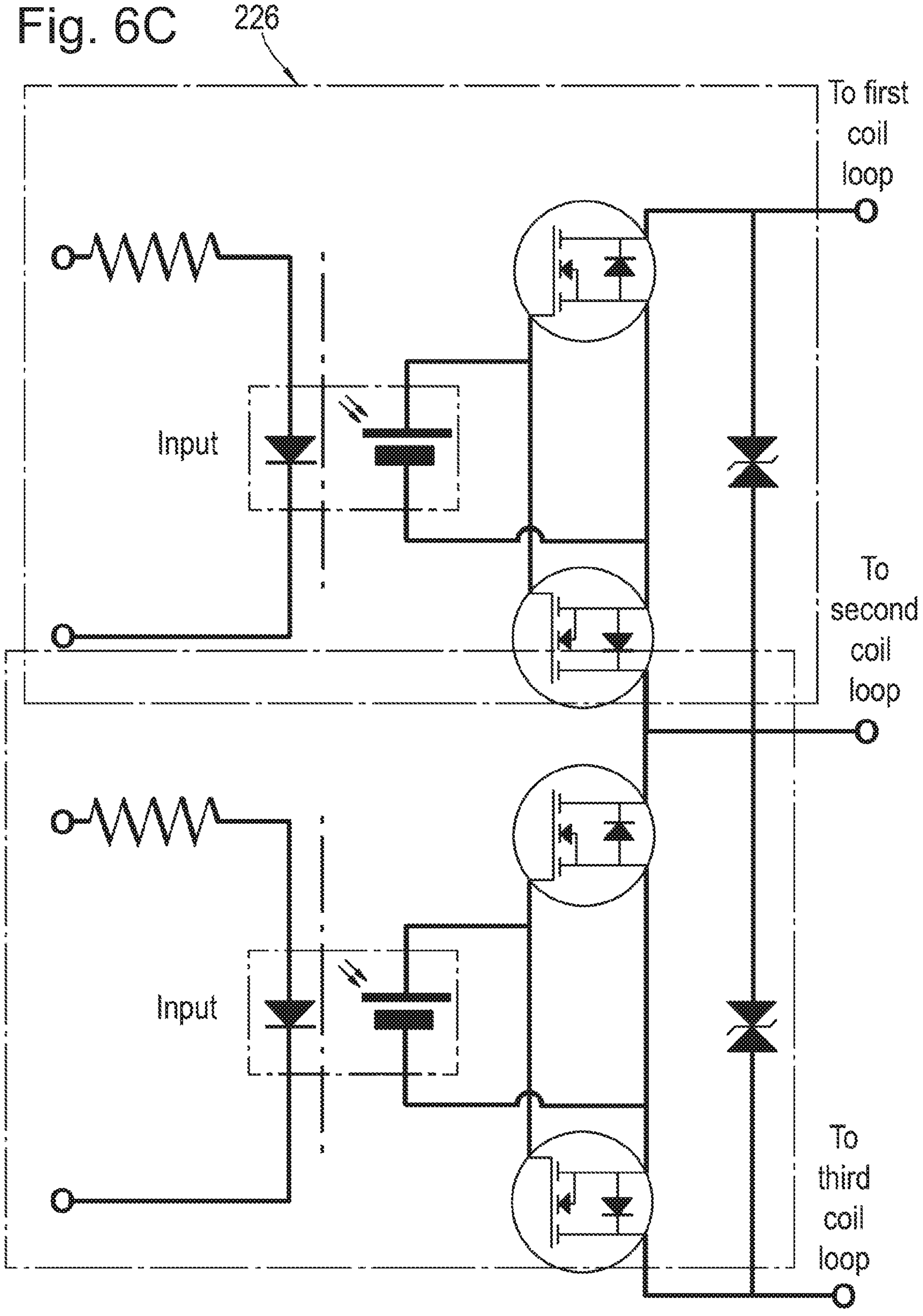

For a three-phase motor, two solid state relay circuits are utilised, as depicted in FIG. 6C. A first SSR circuit 226 is used to connect a first and a second coil loops; a second SSR circuit 227 is then used to connect the second coil loop to a third coil loop. To provide redundancy, in an option of the present invention, the STO device comprises a set of redundant SSR circuits configured for connecting the coil loops of the coil assembly. The redundant SSR circuits are triggered by identical means to the primary SSR circuits. For instance, in an option of the present invention wherein the motor is a three-phase linear motor, inclusive of the redundancy circuits, there are four SSR circuits within the STO device.

Although the present invention according to the first aspect enables the control system to sufficiently differentiate between failure events and false-failure events, it is preferable to reduce or eliminate the causes thereof.

The object of the third aspect of the present invention relates to the impulse experienced by the output shaft when the mechanical brake is released from or applied to the output shaft, i.e. during the initial start-up of the testing apparatus. The impulse or "jolt" experienced is as a result of the mechanical brake disengaging with the output shaft. However, this impulse or jolt can be considered as a failure event as discussed with respect to the first aspect of the present invention and can trigger a fault.

Figure 7:
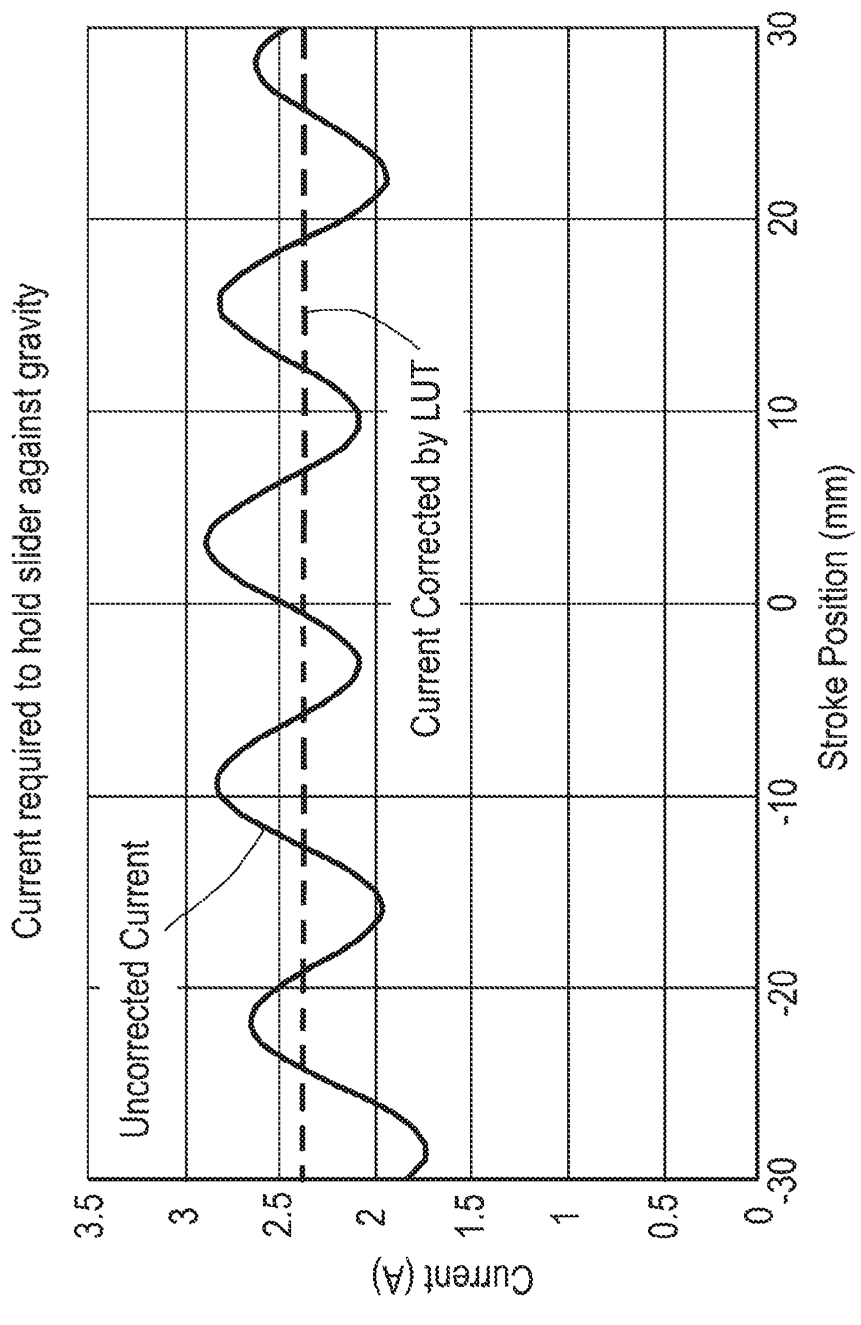
FIG. 7 is a illustrative graphic plot of the current required to hold the output shaft stationary against the action of gravity vs the position of the output shaft according to a third aspect of the present invention.

According to an option of the third aspect, the present invention provides a means to reduce movement of the output shaft caused by the motion of the output shaft when the output shaft is released by the mechanical brake, e.g. when the testing apparatus is switched on and held by the force induced by the coil assembly. The current required to maintain the position of the output shaft within the coil assembly varies with the position of magnets within the output shaft in relation to the three-phases of the coil assembly. Thus, it is possible to determine for the test apparatus a current vs. position look up table, as shown graphically in FIG. 7 where the position of the output shaft along the length of motion is plotted against necessary current. The plot shown in FIG. 7 shows the variation of the current applied to the coil assembly versus the position of the output shaft for a 3-phase motor design. In FIG. 7, there are two plots, a sinusoidal plot which represents the current in the motor and a straight line plot at a constant current that represents an average of the current in the first plot. The look-up table is derived from the sinusoidal plot and represents the current to be applied to the coil assembly necessary to hold or resist movement of the output shaft. For example, at every 2 mm stroke of the output shaft, the corresponding current is noted in a look-up table or database. This is repeated for the full stroke of the output shaft. The straight line provides a base line for which the current is either added to or subtracted from, for the purpose of feeding into the electronics of the testing machine.

According to the third aspect of the present invention, a controller determines the position of the output shaft and correlates the position of the output shaft to a current in the look-up table necessary to hold the output shaft at that given position such that when the current is applied to the coil assembly, the output shaft is resisted from movement.

Figure 8:
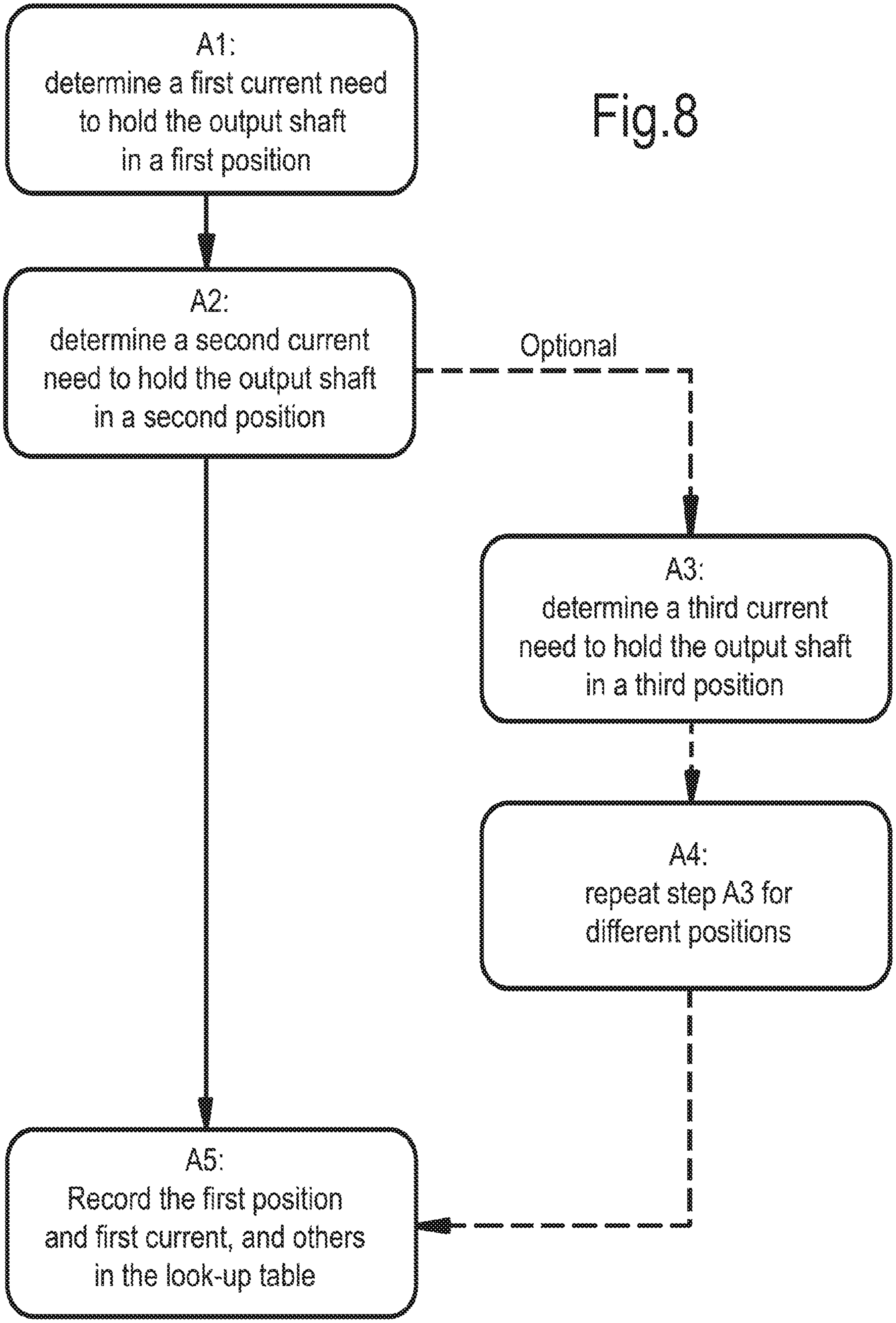
FIG. 8 is a flow chart representation of an option of the present invention for determining the look up table according to the third aspect of the present invention.

The movement control system for a motor comprises a mechanical brake and the controller configured to receive a position of the output shaft within the coil assembly and to correlate the position with a current required to apply to the coil assembly such that motion of the output shaft is resisted when a mechanical brake is released. The controller can correlate the position with current by calculation or by referencing a look up table of current vs position. The look up table can be calibrated during manufacture or alternatively may be calibrated each time a specimen is loaded for testing as the mass of the specimen and a chosen load cell will change the values of current at each position. For example, the testing machine can be run such that the output shaft is run through a range of different stroke positions and the current in the coil assembly is measured at the different stroke positions to generate a plot of current in the coil assembly versus stroke position of the output shaft as shown in FIG. 7. Typically, the current is noted at 2 mm incremental positions of the output shaft and represents the acceptable leeway in the movement of the output shaft when the mechanical brake is disengaged. However, other incremental positions of the output shaft is permissible in the present invention Calibrating the look-up table can be performed using the following method, also shown in FIG. 8:

Step A1—determining a first current needed to hold the output shaft in a first position without engaging the mechanical brake.

Step A2—determining a second current needed to hold the output shaft in a second position without engaging the mechanical brake.

Step A3—optionally—determining a third current needed to hold the output shaft in the second position without engaging the mechanical brake Step A4—optionally—repeating step A3 for successive positions of the output shaft.

Step A5—storing the first position and first current, and others in the look-up table.

In an option of the present invention, the look-up table is calibrated for every position along the entire length of travel of the output shaft.

The above calibration process can be performed automatically, e.g. during start-up of the testing machine, whereby each time the mechanical brake is released at a given position along the coil assembly a feed-back loop is used to vary the current in the coil assembly until the output shaft is held at that position. Movement of the output shaft can be detected by a motion sensor. The position of the output shaft is measured in a conventional way and comprises an optical absolute encoder (transducer) fixed to the motor body or any fixed part of the testing machine cooperating with a graduated scale attached to the moving output shaft. As the output shaft moves, the graduated scale moves relative to the optical absolute encoders. A determination of the position of the output shaft is thus measured from the graduated scale. This is repeated at different positions of the output shaft along the coil assembly. The current values to hold the output shaft at the different position within the coil assembly are stored in a look-up table.

Through the implementation of the look-up table, there is minimal or no motion of the output shaft each time the mechanical brake is disengaged, in an option of the present invention motion is reduced to less than 2 mm.

Industry standards require shoes of the mechanical brake to be rated such that they reliably engage throughout their life. The mechanical brake can comprise a tubular brake shoe that is located concentrically round the output shaft or brake shaft of the motor. The brake shoe 'inside diameter' is slightly larger than the output shaft or the brake shaft of the motor. Conventional test apparatus monitor the number of times that the mechanical brake has been actuated for each brake shoe and recommend to a user that the shoe be replaced once a predetermined actuation threshold has been exceeded.

The purpose of the mechanical brake is to prevent the output shaft dropping under gravity when the linear motor is turned off. Without a mechanical brake, a risk hazard to an operator's hand or fingers is present when accessing the test workspace. The source of the crushing force is derived from the falling mass of the actuator shaft.

The object of the fourth aspect of the present invention is to provide a mechanical brake that enables improved engagement reaction timing over that achieved from conventional linear motor brakes.

Figure 9A:
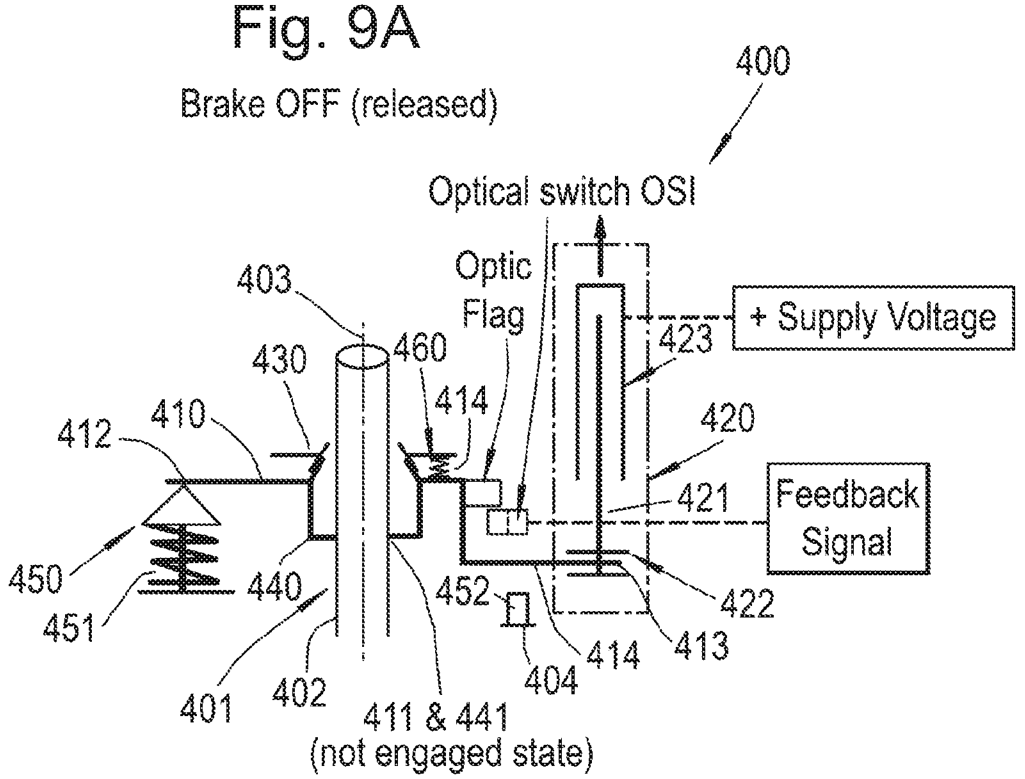
FIGS. 9A and 9B are diagrammatic representations of a mechanical braking system according to a fourth aspect of the present invention, showing the mechanical brake in an off configuration and an on configuration respectively.
Figure 9B:
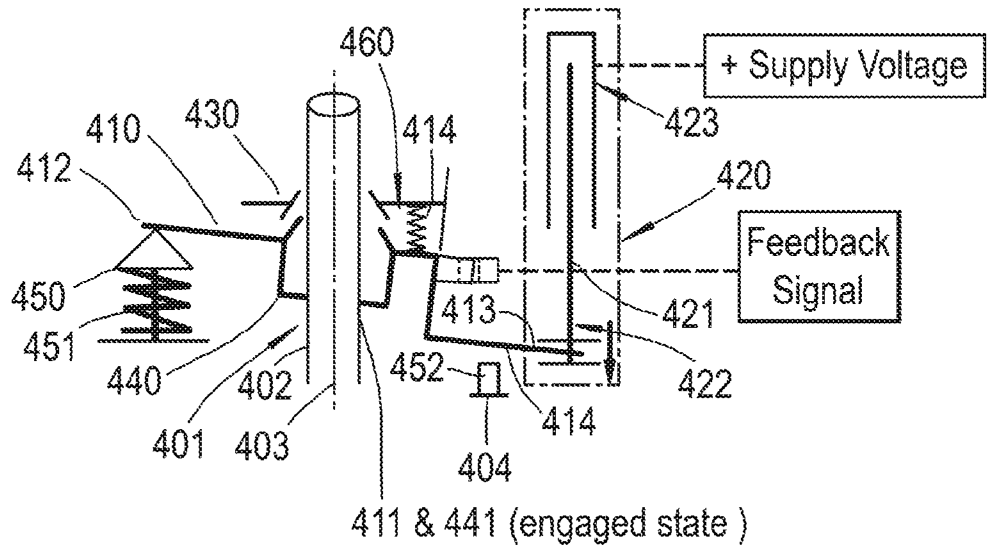

A brake 400, mounted on the frame of a test apparatus incorporating the output shaft 401 of a linear motor as shown in FIG. 9A, 9B, comprises an elongate plate 410 provided with a space for receiving the output shaft, wherein the space in the elongate plate according the present invention may include, but is not limited to, a hole, an opening, a cut-out, an aperture or a slot (made by any suitable means). For the purposes of description, in the following options the space in the elongate plate is a hole 411. The elongate plate 410 plane may be positioned such that it is perpendicular to the output shaft axis 403 or direction of movement of the output shaft 401 when the brake 400 is not engaged. The shape and size of the hole is just larger than the cross-sectional shape and size of the output shaft (e.g. to provide radial clearance) so as to frictionally engage with the output shaft and/or the brake shaft when the elongate plate is tilted.

Alternatively, the shape and size of the hole may correspond to the output shaft such that the edges of the hole are proximate to but not in contact with the output shaft and/or the brake shaft when the brake is not engaged. The tilt angle with respect to an axis perpendicular of the output shaft axis 403 can be approximately 0.1-15 degrees, or more preferably approximately 1-10 degrees, further preferably approximately 2-4 degrees. The tilt angle of the elongated plate is controlled by controlling the geometry or size of the spacing. For example, a large spacing or hole would cause the elongated plate to tilt further as the edges of the spacing would need to travel further before coming into contact with the output shaft. Thus, the further away the edges of the hole are from the output shaft, the greater the tilt angle of the elongated plate necessary for the edges of the hole to be in contact with the output shaft when engaged. To help the elongate plate frictionally engage with the output shaft, more particularly the hole of the elongate plate, the output shaft comprises a brake shaft 402 to which the brake engages. In an option of the present invention, the brake shaft and the output shaft can be integrally formed as a single body; alternatively brake shaft 402 is formed as a sleeve around the output shaft or is an extension of the output shaft. The brake shaft can be fastened to the output shaft by any suitable means, e.g. adhesive or mechanical fasteners. The elongate plate is pivotally, or hingedly, mounted or coupled at one end 412 and is contacted at its other end 413 by a brake inhibitor 420 which is arranged to hold the plate in a position such that there is sufficient clearance between the edge of the hole and the brake shaft and/or the output shaft to allow the brake shaft and/or the output shaft to pass freely through the hole without contacting the edge of the hole. Preferably, this is when the plate is at right angles to the axis or direction of movement of the brake shaft and/or the output shaft.

The brake inhibitor is an electrically actuated device 420 such as a solenoid 423, whereby the electrically actuated device can be an electrically operated holding device and/or electrically operated lifting device. In this case, a linear solenoid, which in normal use when electrical power is available, holds the plate in its "off" condition by means of an actuator rod 421, but when electrical power is not available exerts little or no force on the elongate plate and thus allows it to pivot under the action of gravity so that the edge of the hole contacts the brake shaft and/or the output shaft and causes the brake shaft to frictionally engage and jam with the edge of the hole as it tries to drop, also under the action of gravity. Alternatively, the elongate plate is biased to jam against the brake shaft, i.e. in the "on" condition, and the actuator rod is arranged to disengage the elongate plate, more particularly the hole of the elongate plate from the brake shaft in the "off" condition. In the "on" condition, two contact points (preferably diametrically opposed but offset vertically) are made to engage with the output shaft. This is the "brake on" or "engaged" state and occurs simultaneously with the loss of power to the motor. Therefore, at the point of power loss to the motor, the brake shoe and/or the elongate plate are "dragged" downwards. This allows the braking action to be self-energising which means that the mass of the output shaft acting downwards under gravity (weight) generates the braking force needed to hold the output shaft.

Movement of the elongated plate is by freely pivotally coupling the elongated plate, more particularly an end of the elongate plate to the actuator rod so that vertical movement of the actuator rod causes movement of the elongate plate. In the particular embodiment of the present invention, the actuator rod comprises a retaining groove 422 into which the plate sits. Other coupling means are included in the scope of the present invention, for example, a ball and socket joint. A vertical solenoid offers advantages over the rotary solenoids used in conventional brake systems. In rotary solenoids, the brake inhibitor rotates downward when there is no electrical power available, therefore the action of gravity is transmitted through the pivot point which introduces resistance. For linear solenoids, the actuator rod drops under gravity without resistance from a pivot point or otherwise. Its acceleration is therefore closer to that of gravity, resulting in earlier engagement of the brake with the brake shaft.

It is important that in the "off" condition the brake imparts no friction to the brake shaft as shown in FIG. 9A. This is achieved in the present invention by means of a limit stop 430 fixed to the frame and against which the brake inhibitor presses the plate. To increase the sensitivity of the mechanical brake to frictionally engage with the brake shaft, it is necessary that the hole of the elongate plate is accurately positioned in close proximity with the brake shaft. Accurate positioning of the hole with respect to the brake shaft is achieved using an insert 440 which fits in the hole of the elongate plate. The insert comprises a space, wherein the space according the present invention may include, but is not limited to a bore, an opening, a cut-out, an aperture, a slot (made by any suitable means) through which the brake shaft and/or output shaft passes. For descriptive purposes, the space of the insert is herein described as a bore 441. When the brake is in the "on" condition, the edge of the bore binds or jams against the brake shaft, thereby preventing further movement of the brake shaft. To provide the necessary frictional force between the edge of the bore and the output shaft, optionally the insert comprises a brake shoe that binds against the outside surface of the output shaft when the brake is in an "on" condition.

Figure 9C:
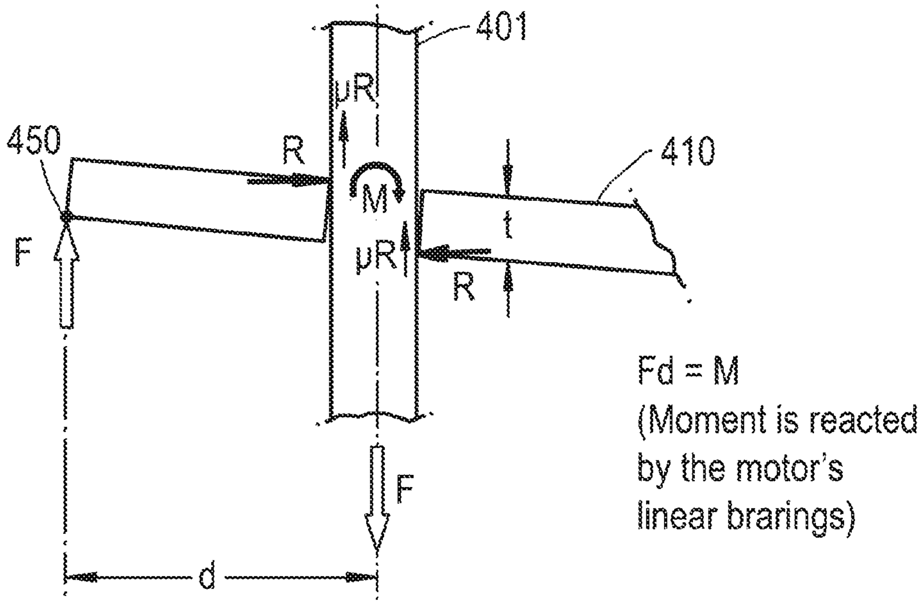
FIG. 9C is a diagrammatic representation of the brake system to aid understanding of the brake theory.

A fundamental feature of the mechanical brake of the present invention is that the braking action is self-energising. This means that the mass of the output shaft acting downwards under gravity generates the braking force needed to hold the output shaft. This braking force is directly proportional to the weight or any further applied load to the output shaft. The ratio of brake force to the output shaft is determined by the geometry of the elongated plate and/or an insert. The brake forces act normal to the output/brake shaft and create a frictional holding force. Provided that the friction coefficient is above a critical value the brake will self-lock. The forces necessary to hold the output shaft when the brake is in the "on" condition can be explained by considering the moment of the elongate plate when the bore binds against the brake shaft. This is expressed mathematically by the equation below with reference to FIG. 9C:

$$Fd=Rt\cos\theta \tag{1}$$

where:—

F=force of mass to be supported, e.g. the weight of the output shaft;

R=reaction force of the brake plate acting on the brake shaft or output shaft;

t=is the thickness of the brake plate;

θ=is the angle that the edge of the bore makes with the output shaft when the brake is in the "on" condition;

d=distance between the pivot point (fulcrum) and the centre of the bore 441;

μ=coefficient of friction between the edge of the bore 441 in contact with the brake shaft and the brake shaft.

For small angles of pivot, cos θ can be approximated to 1, i.e. Fd=Rt.

When the brake is in the "on" condition, the free end of the elongated plate 412 pivots about a pivot point or fulcrum 450. The torque, T, or moment, M, acting on the elongate plate at the point when the bore binds or jams against the brake shaft is given by:—

$$T=Fd \tag{2}$$

The braking forces acting at two points of contact with the brake shaft when the bore binds or jams against the brake shaft as a result of friction is given by:—

$$\text{Braking force}=2\mu R \tag{3}$$

Therefore, the braking force necessary to arrest the brake shaft when the bore binds against the brake shaft must be equal to or greater than the force due to the mass of the output shaft, i.e. 2 μR≥F.

A critical friction, μ_c is reached when the braking force is equal to the weight of the output shaft, $2\mu_c R=F$.

In the particular embodiment of the present invention as shown in FIG. 9B, the elongate plate tilts about a fulcrum positioned on a resilient member 450. The fulcrum is positioned such that the elongated plate pivots about a point which is offset from the axis of the output shaft. In the "off" condition, the limit stop prevents titling of the insert and thereby, ensures that there is clearance between the edge of the bore of the insert and the brake so permitting the brake shaft and/or the output shaft to travel through the bore and/or the hole. In the particular embodiment of the present invention, the insert comprises a projecting portion having an external surface that cooperates with the limit stop. In one example of the present invention, the external surface of the projecting portion has a frusto-conical shape that is arranged to be received in a complementary profile of the limit stop.

The insert is an optional addition, the same function could be achieved by shaping a portion of an upper surface of the plate to a profile that cooperates with the profile of the limit stop. In the present invention, the insert comprises a material suitable for providing a braking effect on the brake shaft such as rubber (e.g. brake shoe). In an option of the present invention, the insert comprises phosphor bronze. In another option, the insert comprises a ceramic. In an option of the present invention, the plate comprises aluminium or another suitable stiff material. In an option of the present invention, the plate comprises a ceramic. When the elongate plate comprises ceramic, the insert may also be ceramic or another braking material and the plate and insert can be integrally formed as a single body.

The force acting on the actuator rod is non-linear at each stroke of the actuator rod. This can be seen in the plot of force acting on the actuator rod against the length of stroke of the actuator rod shown in FIG. 9J and is influenced by the degree of overlap of the actuator rod with the coils of the electrically actuated device. The force decreases as the actuator rod moves away from a retracted position into an extended position. This can be problematic as the holding force at this level of extension may not generate sufficient holding force to hold the elongated plate and/or output shaft in the “off” condition. Thus, at the point of the brake release (“off” condition), the actuator rod will be at a large stroke position where it produces the lowest force.

As the actuator rod has a rigid connection to the elongated plate, it may be possible for the actuator rod to be in a retracted position, i.e. hitting the end stop of the solenoid, in the “off” condition before the elongated plate is seated up against the limit stop 430. In this case, the mechanical brake may still be at least partially engaged with the output shaft causing the mechanical brake, more specifically the insert (brake shoe), to “rub” against the output shaft.

Equally, it may be possible for the elongated plate to be seated up against the limit stop 430 when the actuator rod is in a partly retracted position. According to FIG. 9J, at the partially retracted state of the actuator rod, the solenoid produces an increasingly lower holding force.

In order to overcome these “drawbacks”, the coupling between the actuator rod and the elongated plate comprises an extendable feature. The extendable feature 501 (coupling device) comprises a pre-loaded resilient member 502 (e.g. a pre-loaded tension spring or a resiliently extendible member) attached to an end of the actuator rod coupled to the elongated plate (or lifting end) such that in the relaxed state of the resilient member, the expandable member expands causing the actuator rod to retract further and thereby, causing the elongated plate to be seated against the limit stop in the “off” braking condition, i.e. butt up against the limit stop 430. At this orientation of the elongated plate, the clearance between the bore of the elongated plate and the output shaft is sufficient to allow the output shaft to move without rubbing against the elongated plate. The expandable coupling allows the length of the actuator rod to be expandable by approximately 3.5 mm. However, it is feasible that for different levels of loading on the resilient member, the extension can have a range between 0.1 mm to 10 mm. The expendable feature provides some additional give to the coupling between the actuator rod and the elongated plated to allow the elongated plate to be seated up against the limit stop 430 when retracted.

Figure 9D:
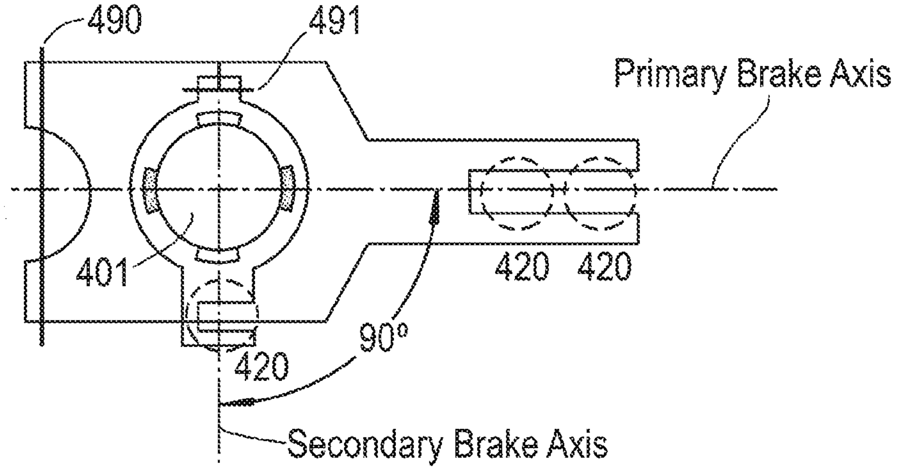
FIG. 9D is a plan view representation of a mechanical braking system comprising a primary and secondary braking system.
Figure 9E:
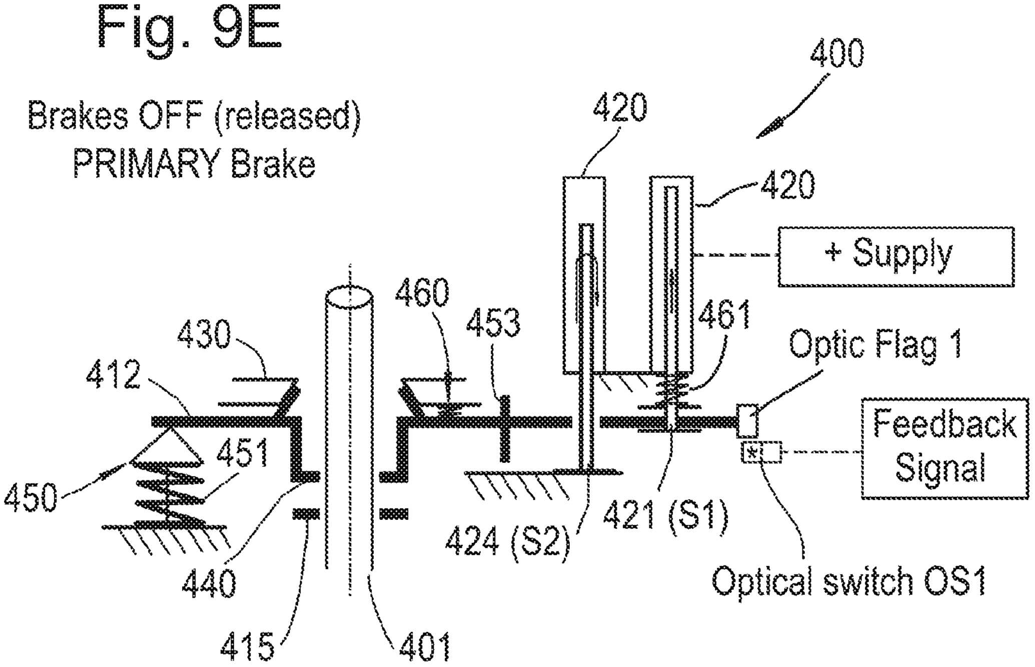
FIGS. 9E-9H are diagrammatic representations of a mechanical braking system comprising a primary and secondary braking system.
Figure 9F:
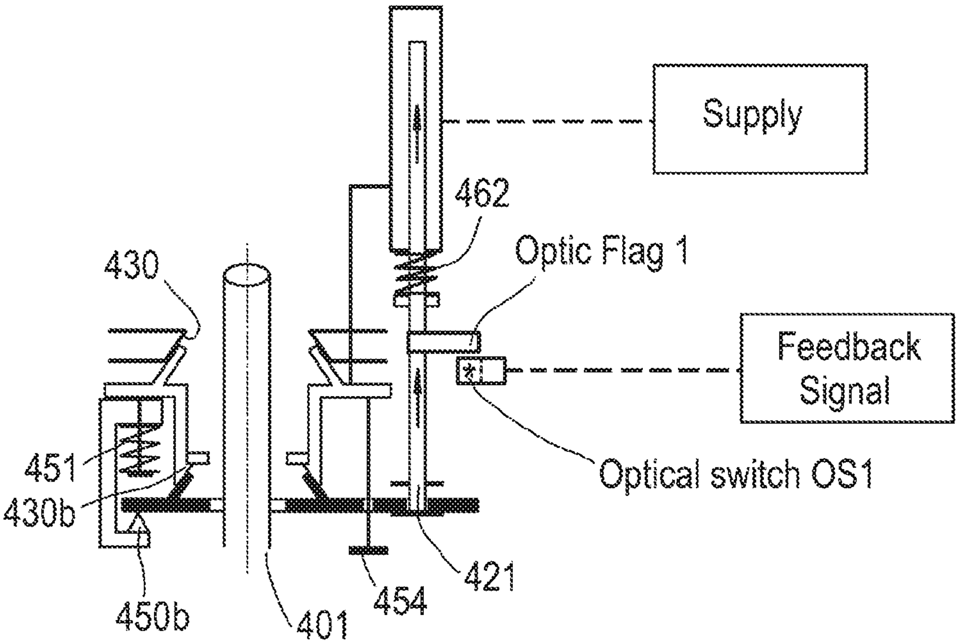
Figure 9G:
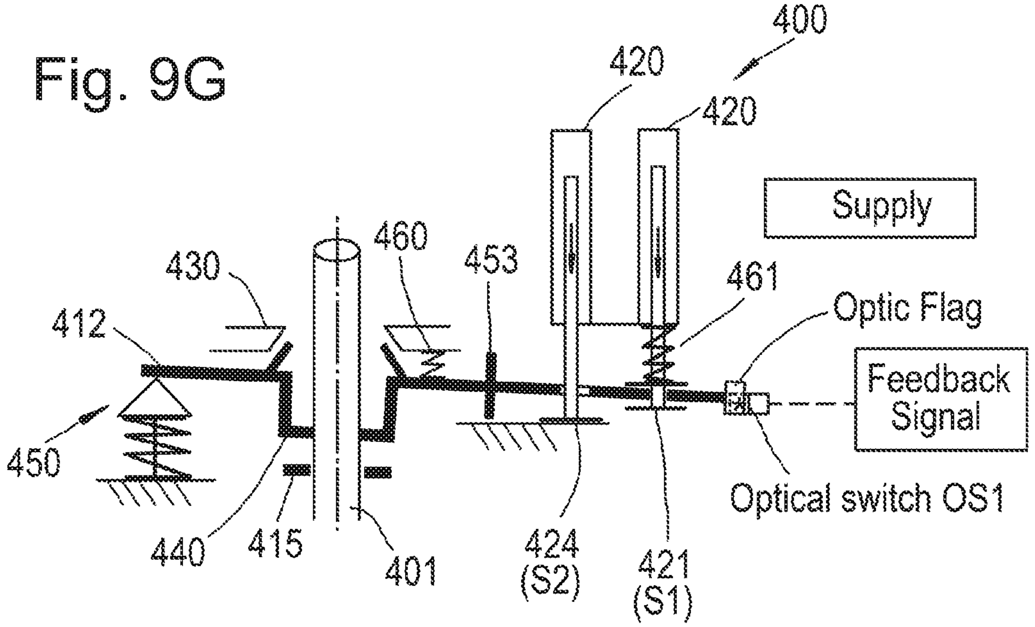
Figure 9H:
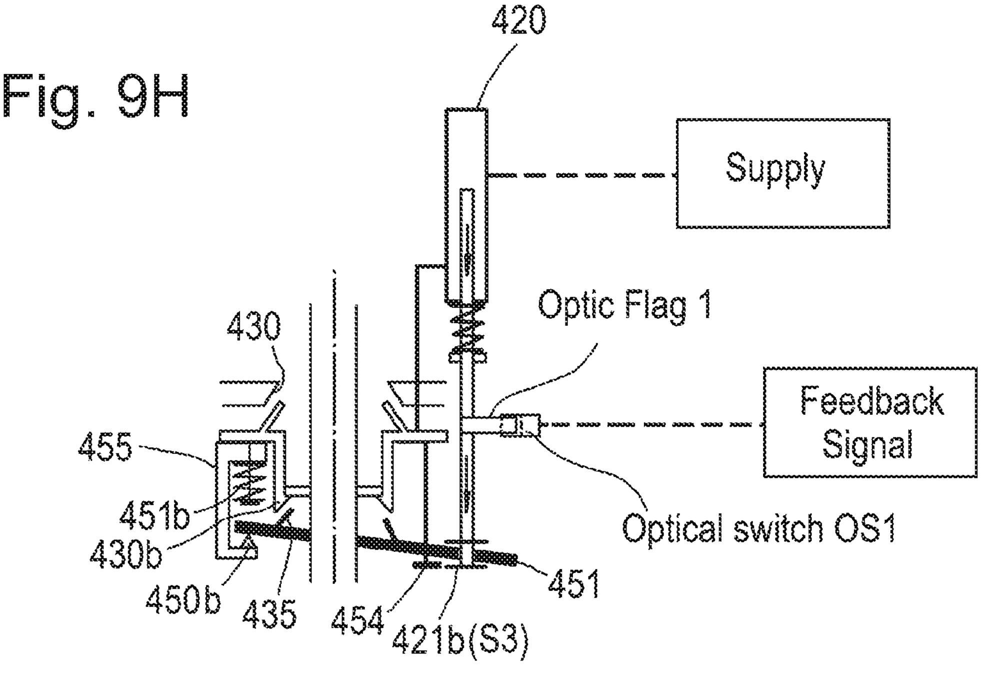
Figure 9I:
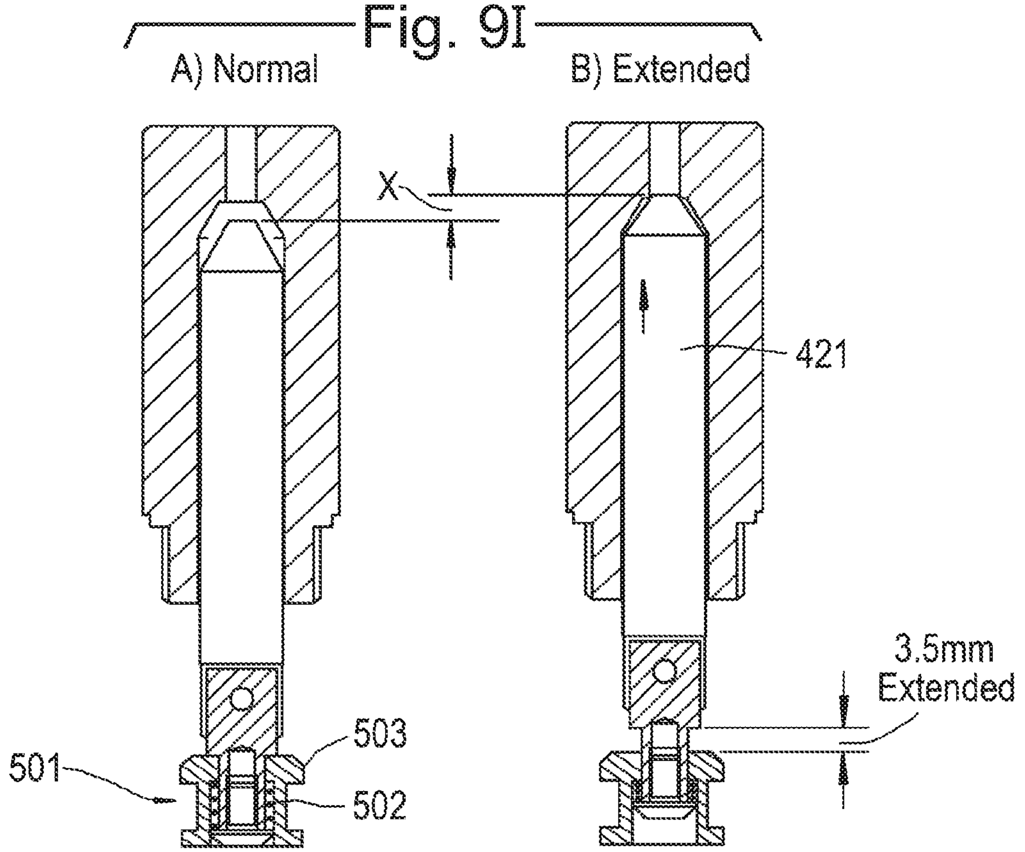
FIG. 9I is a diagrammatic representation of an actuator rod coupled to an extending feature.

In the particular embodiment of the present invention as shown in FIG. 9I, the extendable feature comprises an insert attached to the lifting end of the actuator rod and is moveable within a grooved or flanged housing 503. The insert is held within the flanged housing by a pre-loaded resilient member. The groove or flange of the housing cooperates with the elongated plate so that movement of the actuator rod causes movement of the elongated plate. When the pre-loaded resilient member is in a relaxed state, the insert moves upwards within the flanged housing and thereby, allowing the actuator rod to be more so retracted within the electrically actuated device or solenoid.

Figure 9J:
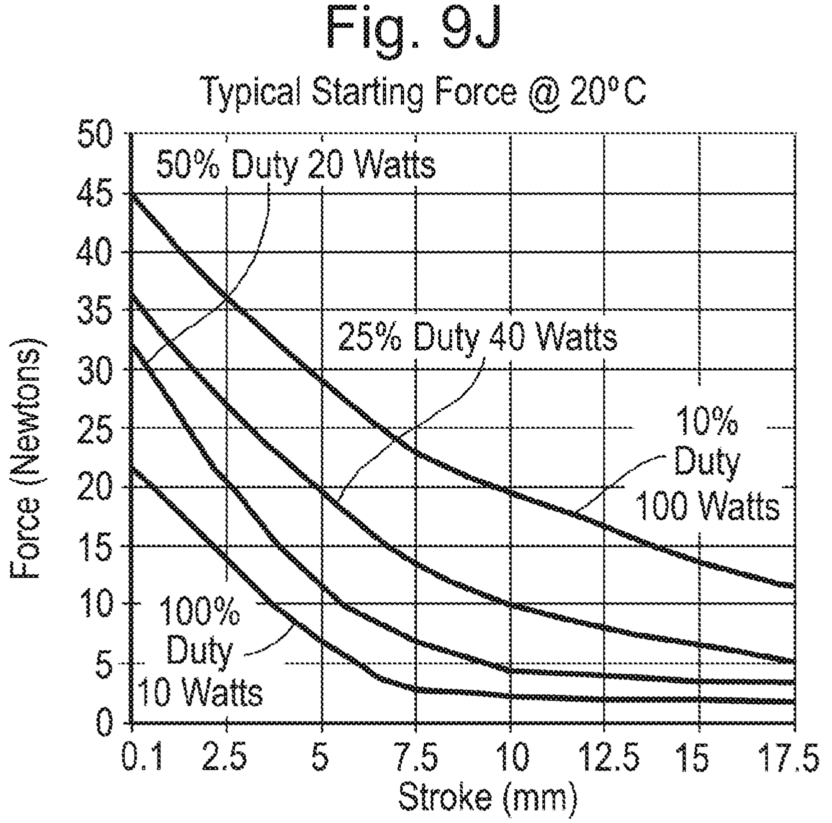
FIG. 9J is an illustrative graphical plot to show the non-linear behaviour between the actuator force with the actuator rod stroke.

Even if the elongated plate is seated up against the limit stop 430, the extendable feature 501 allows the actuator rod to be more retractable within the electrically actuated device when the mechanical brake is released, i.e. in the “off” condition. At the point of brake release, when the electrically actuated device is pulsed with current, the extendable feature allows the actuator rod to be instantly extended by the full travel of the resilient member and thus, allows greater retraction of the actuator rod within the electrical actuated device housing, i.e. coils, than is achieved without the extending feature. In an ideal scenario for maximum holding force, the actuator rod is fully retracted with the electrically actuated device housing. As a result, the actuator rod is operating closer to the high force end of the electrically actuated device, preferably the high force end of the electrically actuated device as shown in FIG. 9J. Any of the actuator rods of the electrically actuated devices may comprise an actuator rod extendable feature of the present invention.

The present invention further differs from conventional brakes such as that of EP 2 054219 B1 (MEAD, Graham) 6 May 2009 in that the elongated plate pivots about a fulcrum encouraged or biased by a resilient member 460. The resilient member is arranged to provide a force acting to rotate the plate into its “on” condition as shown in FIG. 9B, i.e. the resilient member 460 biases the elongated plate into its “on” condition. In an option of the present invention, the resilient member is a spring or another suitably elastic member. The resilient member can be a compression spring, such that when the brake is in the “off” condition the spring is compressed by the action of the actuator rod lifting the plate. In the “on” condition, the spring decompresses, increasing the rate at which the plate accelerates downward.

In an alternative option, the resilient member is an extension spring, positioned below a lower surface of the plate such that when the brake is in the “off” condition the spring is extended by the action of the actuator rod lifting the plate. In the “on” condition, the spring returns to a non-extended state, increasing the rate at which the plate accelerates downward. In an option of the present invention, the resilient member comprises both an extension spring positioned below a lower surface of the plate and a compression spring positioned above an upper surface of the plate. Alternatively or additionally, the elongated plate can be biased in the “on” condition by the provision of a resilient member 461 positioned on the actuator rod 421 and acting to bias the elongated plate in a tilted or pivoted orientation which in turn causes the edge of the bore to jam against the braking shaft. For example, in the particular embodiment of the present invention as shown in FIG. 9E, an extension spring (not shown) can be positioned along the actuator rod 421 and located between the groove 422 and the solenoid body. As with the other resilient members, extension of the spring increases the rate at which the elongated plate accelerates downwards (i.e. increases the rate at which the brake is engaged into the "on" condition).

The inclusion of the resilient member has the additional effect such that when the brake is disengaged from the brake shaft, the impulse exerted by the brake on the brake shaft is reduced. The resilient member can be included in the conventional brake designs such as that of EP 2 054219 B1 (MEAD, Graham) 6 May 2009, in which rather than a linear solenoid, a rotary solenoid is used.

When electrical power is restored, i.e. the brake is instructed to release, a high force is required and it is preferred to inject a pulse of energy from one or more capacitors into the solenoid to release the brake.

To move and/or hold the elongated plate from an "on" braking condition to an "off" braking condition, it is necessary that the electrically actuated device (brake inhibitor) 420 is able to lift the elongated plate so as to allow the elongated plate to pivot about the fulcrum 450 and thereby, allow the brake shaft and/or the output shaft to pass freely through the hole without contacting the edge of the hole. However, due to the loading of mechanical brake by the output shaft, the mechanical brake, more specifically the elongated plate is initially jammed against the output shaft, and more energy maybe required to initially lift the elongated plate than is able to be provided by a single electrically actuated device when in an "on" condition. One option would be to upsize the electrically actuated device to a more powerful electrically actuated device. However, this has the drawback that it usually requires more power consumption dissipating more heat with the resultant effect of requiring additional cooling. Additional drawbacks are that it is generally larger in size than is permissible by the size constraints of the testing apparatus. Another option, would be to have a second electrically actuated device that works in tandem with the aforementioned electrically actuated device (first electrically actuated device) to lift and hold the elongated plate. However, this still suffers from the problem of the need to provide additional power to operate both of the electrically actuated devices. The present applicant realised that the greatest lifting force is only required momentarily when initially lifting the elongate plate away from the "on" condition, i.e. to provide a momentary lifting "kick" action to the elongated plate. This momentary lifting "kick" action may be to provide the necessary force to initially disengage the insert(s) (or brake shoe) from the surface of the output shaft 401 or brake shaft. Once the brake shoes (inserts) have been disengaged from the output shaft or brake shaft, not much energy is required to hold the elongated plate in the "off" condition. The elongated plate can, therefore, be held in the "off" condition by supplying power to the first electrically actuated device alone. The second electrically actuated device (e.g. an electrically operated lifting device 424) may then be put in a de-powdered state and therefore becomes redundant until additional lifting force is required to disengage the elongated plate from the "on" condition, more particularly the bore of the elongated plate, from the output shaft or brake shaft.

In comparison to the first electrically actuated device whereby the actuator rod of the first electrically actuated device engages with the elongated plate in both the upward and downward direction of the actuator rod by means of the retaining groove 422, i.e. movement of the actuator rod corresponds with the movement of the elongated plate, the actuator rod of the second electrically actuated device is only permitted to provide a lifting action of the elongate plate. This is to prevent the weight of the elongated plate influencing the mechanical brake when power to the second electrically actuated device has been removed, i.e. the actuator rod does not push the elongated plate down when power to the second electrically actuated device is removed. In the particular embodiment of the present invention as shown in FIG. 9E, the actuator rod of the second electrically actuated device comprises a support surface that engages with the underside of the elongated plate in the upward direction but disengages from the elongated plate in the downward direction. For example, the support surface can be a plate that become in contact with the underside of the elongated plate when moving in the upward direction and so providing a lifting action.

In order to protect the mechanical brake mechanism from excessive loads, the mechanical brake of the present invention further comprises a means for limiting the degree of braking force which can be generated by the pivoting plate arrangement to enable ready resetting of the apparatus. This is achieved by arranging a first end of the plate to pivot about the fulcrum that is resiliently mounted by means of a spring 451, or another resilient member, and a second end of the plate provided with a projection 453 or an overload stop arranged to be spaced from a surface 404 of the actuator or a mechanical brake housing positioned below the plate. The spring provides a biasing force acting in a direction opposite to the force of gravity. In this way, should excess force be applied in a downward direction after the brake has been activated, the plate can be pulled downwards against the spring force until the projection or overload stop contacts the surface whereupon the elongate plate will tend to pivot about the projection or overload stop against the spring force so as to permit movement of the brake shaft and/or the elongate shaft through the hole and/or the bore. It will be appreciated that should this excess force be removed, the braking action will be immediately restored and the brake shaft held in its new position. The spring limits the braking force to a value which can be readily released simply by activating the solenoid.

The present invention, provides an improvement to the mechanical brake of EP 2 054219 B1 (MEAD, Graham) 6 May 2009. Throughout the working life of the brake, the abrasion between the plate and the brake shaft results in the wearing down of the surface of the plate (or, if present, the insert). As the shape of the hole in the plate changes shape and size, the brake angle at which the plate lies when the brake is in the "on" condition increases. Therefore, late in the useable life of the brake, there comes a point at which the projection contacts the surface below the plate even though the brake has yet to engage the brake shaft. In the present invention, this surface is adjustable such that the surface can be lowered and/or raised. Therefore, restoring the distance between the projection and the surface and extending the useable life of the brake. In another option of the present invention, the projection comprises an adjustable length.

Rather than the plate comprising the projection, instead, in another option of the present invention, the surface 404 comprises an overload stop 452 for contacting the lower surface of the plate. The height of the overload stop is adjustable. The means for adjustment may be via a screw mechanism or any other suitable means. The stop having identical function to that of the projection.

The object of the fifth aspect of the present invention is to provide a mechanical brake performance monitor that enables improved monitoring of the mechanical brake.

The performance monitor comprises a controller configured for receiving signals corresponding to the position of the output shaft. In an option of the present invention, the position of the output shaft is determined by the encoder.

During normal use, the actuation of the mechanical brake has several phases:

1. arming—comprises removing power from the solenoid such that the plate pivots and engages with the brake shaft; during the "arm" phase the brake shaft is held in place by the electro-magnetic linear motor.

2. loaded—comprises removing power from the linear motor such that motion of the brake shaft under gravity is only arrested by the action of the mechanical brake.

During the loaded phase, the brake shaft of a linear motor 'drops', this is due to mechanical stresses within the brake plate. Drop is an intrinsic property of brake, a result of the materials chosen and the energy of the system, it is not a constant however, the variance over time is minimal. When in the braking phase, there is another effect that may result in motion of the brake shaft; the effect may be due to excessive wear of the brake or a change in the frictional coefficients of the portion of the brake plate engaging the brake shaft and the brake shaft itself. The degree of 'slip'—the distance through which the brake shaft moves when in the loaded phase not attributable to 'drop'—needs to be monitored as increased 'slip' indicates a need to service or replace the brake. Moreover, as the mechanical brake, more specifically the brake shoe wears, the spacing between the lower surface of the elongated plate and the overload stop 452 gradually reduces. This results in an increasing tilt angle of the elongated plate as the elongated plate is engages with the brake shaft. If the lower surface of the elongated plate comes into contact with the overload stop 452 in the arming condition, then this is also an indication that the mechanical brake is comprised or worn out. The terminology "plate", brake plate", "elongate plate" and "elongated plate" are used interchangeably throughout the specification to describe the same feature.

Figure 10:
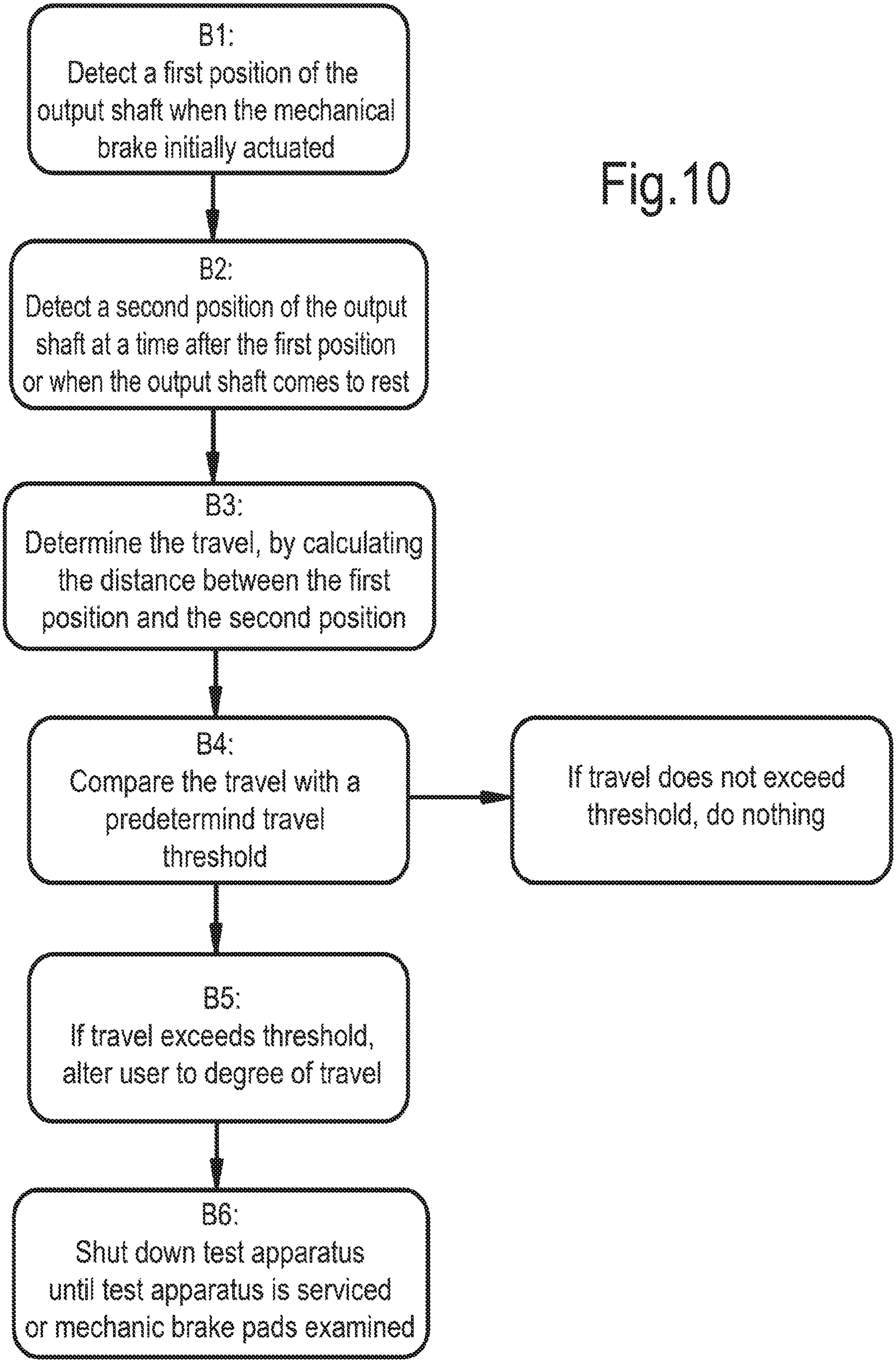
FIG. 10 is a flow chart representation of a method of brake performance monitoring according to an option of a fifth aspect of the present invention.

The performance monitor is configured to determine the 'slip' of the brake shaft. Owing to 'drop' variance being minimal but ever-present, the performance monitor determines 'slip' plus 'drop'. In the present discussion, the term 'travel' is understood to include the drop distance (i.e. travel=slip+drop). Wherein travel corresponds to the displacement of the output shaft over the duration of actuation of the mechanical brake. Following the method steps shown in FIG. 10, the performance monitor monitors the travel of the output shaft:

Step B1—recording a first position corresponding to a position of the output shaft when the mechanical brake is initially actuated such that the mechanical brake is engaged with the output shaft.

Step B2—recording a second position corresponding to a position of the output shaft at a predetermined time after the first position is recorded or when the output shaft comes to rest.

Step B3—determining the travel, by calculating the distance between the first position and the second position and/or storing the travel.

Step B4—comparing the travel with a predetermined slip threshold.

Step B5—alerting a user to the degree of travel if the travel exceeds the predetermined travel threshold.

Step B6—shutting down the test apparatus if the travel exceeds the predetermined travel threshold until the test apparatus has been serviced and/or the mechanical brake examined.

A sensor, e.g. an optical switch, is used to monitor whether the mechanical brake, more specifically the hole of the elongated plate, is in engaged state with the output or brake shaft or not. An "optical flag" mounted to the elongated plate interrupts a light beam to an optical switch each time the mechanical brake engages with the output shaft, i.e. in a titled orientation. This generates a feedback signal to a controller indicating that the mechanical brake is in an "on" condition. When the mechanical brake is released or in an "off" condition, the elongated plate is in a horizontal condition and light to the optical switch is not interrupted. Other sensors to monitor the position of the elongated plated and therefore, engagement with the output shaft is permissible in the present invention, e.g. rotational sensor.

In an option of the present invention, the time between the first and second measurements is between 0 and 1 seconds, optionally 0.25 s.

In an option of the present invention, the predetermined travel threshold is between 0 and 10 mm, optionally 2 mm.

In an emergency event, the output shaft undergoing uncontrolled movement, the performance monitor records the position at which the mechanical brake receives the instruction to brake as the first position rather than position once the brake is armed.

To pre-empt the output shaft from slipping excessively, the performance monitor may also monitor and/or record the number of actuations of the mechanical brake. A firmware records/counts the number of times the sensor detects the mechanical brake engages with the output shaft. If the controller determines that the number of actuations of the mechanical brake exceeds a predetermined value, then a warning message is sent to the user. For example, endurance testing shows that the mechanical brake can complete in excess of 50,000 operations from the initial setting at the building stage before the lower surface of the elongated plate contacts the overload stop.

By monitoring the number of actuations and/or the travel of the mechanical brake, the performance monitor can more accurately determine when the mechanical brake is not fit for purpose and could cause injury or damage. The performance monitor is configured to alert an operator and/or third party when the mechanical brake is a risk to the operator's safety.

The purpose of the mechanical brake is to prevent the output shaft of the motor falling under gravity when the motor is turned off. Without such a mechanical brake a crush risk hazard to an operator's hand or fingers is present when accessing a test workpiece. The source of the crushing force is derived from the falling weight of the output shaft. However, a dangerous condition could arise should the mechanical brake fail to engage with the output shaft and provide the necessary braking action to arrest the output shaft. For example, the brake shoe/insert could be worn and fail to provide the necessary frictional force to arrest the output shaft. Other examples, include the electrically actuated device fail to be in an armed position through a fault in the electrical switching which fails to remove the power to the solenoid to allow the mechanical brake engage with the output shaft, i.e. the elongated plate is unable to move, e.g. the actuator rod of the electrically actuated device fails to reciprocate within the solenoid. To mitigate the possibility of the mechanical brake failing, in a sixth aspect of the present invention, the mechanical brake comprises a primary mechanical brake and a secondary mechanical brake. The secondary brake provides a redundant (secondary) mechanical brake to the primary braking system should the primary braking system fail. The primary brake and the secondary brake can be based on the mechanical brake discussed in the fourth aspect of the present invention discussed with reference to FIG. 9A and FIG. 9B, i.e. their respective elongated plates pivot about their respective fulcrum 450, 450*a*. Both primary and secondary brakes can operate independently or dependently of one another. Optionally or additionally, both the primary and secondary brake can work simultaneously or sequentially.

Both the primary and secondary mechanical brakes may be simultaneously actuated, i.e. power to their respective solenoids are turned off at the same time. The braking action of the output shaft is shared between the primary mechanical brake and the secondary mechanical brake. Optionally, in normal braking, both the primary and secondary brakes are engaged but only the primary brake takes the braking load, i.e. holds the output shaft up. In this scenario, the secondary brake is engaged but does not become loaded, i.e. it is in the armed condition. Since the secondary mechanical brake is in the armed condition when the primary mechanical brake takes up the load of the output shaft, the requirement for an additional electrically actuated device, e.g. solenoid, the need to provide an additional lifting action of the elongated plate of the secondary mechanical brake to momentarily release the secondary mechanical brake is not necessary as with the primary mechanical brake. Unlike the primary mechanical brake which bears the full load of the output shaft, the force to lift the elongated plate of the secondary mechanical brake is not so great as it is primarily in the "armed" condition.

Focusing a greater share of the braking action on the primary mechanical brake rather than the secondary mechanical brake can be controlled by controlling the tilting action of their respective elongated plates which in turn is controlled by the geometric shape and/or size of the hole for receiving the output shaft of the respective elongated plates. For example, the hole in the elongated plate of the secondary mechanical brake is intentionally made larger and/or of a different geometric shape to the hole in the elongated plate of the primary mechanical brake such that when both the primary mechanical brake and the secondary mechanical brake are actuated simultaneously, the primary mechanical brake engages the output shaft before the secondary mechanical brake and thereby, takes up the load of the output shaft.

By allowing the primary mechanical brake take up the load of the output shaft and "arming" the secondary mechanical brake, wear of the mechanical brake, specifically the brake shoe primarily occurs with the primary mechanical brake. The brake shoe of the secondary mechanical brake does not experience such excessive wear as the primary mechanical brake since it is only loaded when the primary mechanical brake fails. In such an event and to maintain the safety of the testing device, a service engineer changes the brake shoes of both the primary mechanical brake and/or the secondary mechanical brake should the primary mechanical brake fail.

The secondary brake may take the braking load (partially or wholly) in at least one of the following conditions:

a) the primary brake fails to continue to hold after any period of successful holding action; and/or b) the primary brake fails to engage in the first instance when called upon.

The secondary braking system can have several optional operating modes:

A. Turning output shaft ON and therefore, the mechanical brake off. Prior to "turn on", the output shaft is supported by both of the mechanical brakes (e.g. the primary and the secondary mechanical brake) since both of the mechanical brakes are in an engaged state. Turning the actuator on leads to the primary and the secondary mechanical brakes being released ("off" condition) in sequence or simultaneously. The secondary brake may be released first (no power has been supplied to the motor driving the output shaft at this point) followed by the release of the primary brake following a short delay between 0 and 1 second, preferably between 0.1 and 0.5 seconds, more preferably between 0.1 and 0.3 seconds. Simultaneously with the release of the primary brake, power is applied to the motor. Each brake is released by applying a high pulse of current to the electrically actuated device(s). The electrically actuated device lifts the elongate plated to the released position by pivoting about their respective fulcrum(s).

In some cases, as shown in FIGS. 9D to 9F, the primary brake may comprise two electrically actuated devices 421, 424 (S1 and S2) which work in parallel. Electrically actuated device 421 S1 may provide a lift and holding action and remains powered to hold the brake about its respective fulcrum 450 in the released state. Electrically actuated device 424 S2 provides a lifting action and is optionally de-powered after as discussed above, therefore becoming redundant. In some cases the electrically actuated device 424 S2 remains engaged, but it may be preferable to de-power it for several reasons: firstly, providing continuous power leads to the supply circuit dissipating more heat and having to consume more power; secondly, the stroke on the electrically actuated device 424 S2 may be too small to provide any additional holding action; thirdly, a "dangerous failure" may occur if the actuator rod becomes jammed while holding the brake in a released condition. The second electrically actuated device 424 S2 is positioned with an actuator rod near the end of stroke to provide maximum force but has a correspondingly short operating travel. The second electrically actuated device, 424 S2, is provided only when required to deal with the extra lifting and/or releasing force required to initially kick start the release of the output shaft as discussed above. In some cases, the electrically actuated device 424 S2 is positioned with an actuator rod near the end of stroke to provide maximum force but has a correspondingly short travel of operation. As discussed above, a second electrically actuated device is not needed to provide a lifting action for the secondary mechanical brake since the secondary electrically actuated device is in the "armed" condition when the primary mechanical takes up the load of the output shaft.

B. Turning output shaft OFF, i.e. loading the mechanical brake. When the power is turned off, the supply to the electrically actuated device(s) of the primary brake 421, 424 and the electrically actuated device 421*b* S3 of the secondary brake is removed. The respective elongated plates of the secondary and primary brakes 410, 415 consequently drop and engage with the brake shaft to the "armed" position, i.e. ready to be loaded by the weight of the output shaft. The arming action may be effected by two means: a) by gravity whereby the mass of the elongated plates and actuator rods are free to fall and, optionally, b) one or two resilient members on the primary brake and the secondary brake provide additional engagement force.

The resilient members of the primary and secondary brakes are optional. The number of resilient member(s) provided with the electrically actuated devices (S1, S2 or S3) serve to enhance the brake engagement phase. They provide an increased accelerating force to the elongate plates when being "armed" into contact with the output shaft, and consequently reduce the time taken for the output shaft "drop" into the engagement with the output shaft, i.e. armed position. They also assist in the mechanical brake to properly nest against the output shaft at the arming stage.

To ensure that the power to the output shaft is not lost before the brakes have had time to engage, the power to the output shaft is removed after a short delay (approximately between 0 and 1 second, preferably approximately 0.25 seconds) introduced by a capacitive circuit in the electrical drive unit that controls the power to the motor. Ideally, the mechanical brakes is still engaged with the output shaft whilst there is still power to the output shaft. Preferably, the time from when power to the electrically actuated device holding the elongated plate in the "off" braking condition is removed and the time the mechanical brake engages with the output shaft is short (preferably between approximately 0 and 0.1 seconds, more preferably approximately 0.02 seconds). Once power to the output shaft is removed, the mechanical brake becomes loaded (in the "on" brake condition), supporting the weight of the output shaft. At this stage, the primary mechanical brake takes the load of the output shaft whilst the secondary mechanical brake remains "armed". As the mechanical brake becomes loaded, there is a normal output shaft drop or slip of 0.1-0.5 mm (with no added weight) to approximately 0.5 mm with maximum added weight. The variance is due to the mechanical stiffness of the brake and the position of the output shaft in the stroke within the coil assembly of the motor since the electromagnetic forces acting on the output shaft vary with position within the coil assembly.

C. Dangerous failure. If the primary brake fails to engage the shaft and provide braking action, (e.g. for reasons discussed above) the secondary brake will now provide the braking action, i.e. moving from the "armed" condition to taking up the load of the output shaft.

In the case where the power to the output shaft is turned off as a result of a safe speed monitor (SSM) intervention, the arming time of the brake is seen as the drop of the output shaft since the output shaft is now subject to free fall under gravity (due to less frictional losses) until the brake is engaged. The presence of the biasing springs minimise the arming time and, consequently, the output shaft drop distance. The acceleration of the elongated plate and thus, the mechanical brake into engagement with the output shaft is dependent on the resilience of one or more resilient members biasing the elongated plates into the armed position. In the case where the resilient member is a spring, the acceleration of the elongated plate and thus, the mechanical brake into engagement with the output shaft is dependent on the spring constant (N/m). In one example, the primary mechanical brake may comprise a first resilient member producing a force of 10 N and a second resilient member producing a force of 5 N. The secondary brake may comprise a resilient member producing a force of 19 N. The accumulative forces of the resilient members of the primary brake and the secondary brake causes the elongated plates to accelerate faster than when only one resilient member of the primary brake acted on the elongated plate. The combination of the resilient members of the primary brake and the second brake reduces the arming time of the mechanical brake by approximately 30% in comparison to if there were no resilient members, i.e. when the respective elongated plates free fall under gravity.

However, having a dual mechanical braking system should the primary mechanical brake fail can be impractical due to the dimensional constraints imposed by the primary and secondary mechanical brake within the testing apparatus, in particular the length of the output shaft. The output shaft would have to be made longer to accommodate both the primary mechanical brake and the secondary mechanical brake, which would make the testing machine too long. Increasing the length of the output shaft has a tendency to reduce the flexural rigidity of the output shaft. To provide a more compact braking system, preferably the secondary brake is rotationally offset from the primary brake about the output shaft axis 403. This has the benefit that the primary and secondary brake engages with the output shaft at different circumferential positions on the output shaft. Therefore, the elongated plates of the respective primary and secondary brakes pivot about their respective axes that are offset from each other, i.e. they are non-parallel. By rotationally offsetting the primary brake and the secondary brake, the physical dimensions of the secondary brake, in particular the elongated plate of the secondary brake can be made much smaller than the primary brake. For example, the secondary brake can do away with the insert which fits in the hole of the elongate plate. In the particular embodiment of the present invention as shown FIG. 9D, the secondary brake is orientated substantially perpendicular to the primary brake about the longitudinal axis 403 of the output shaft such that their respective pivot axes 490, 491 are substantially perpendicular.

As with the primary brake, the secondary brake may similarly comprise an overload stop 454 so as to prevent excessive loads being applied to the secondary brake mechanism. The overload stop 454 of the secondary brake can either be mounted to the elongated plate 415 of the secondary brake or alternatively as shown in FIG. 9F mounted or anchored onto the lower surface of the elongated plate 410 of the primary brake and comprises a surface that is arranged to contact the lower surface 404 of the elongated plate of the secondary brake when excessive loads are applied to the secondary brake mechanism. For the purpose of explanation, the elongated plate of the primary mechanical brake can be referenced as a pivotally mounted first plate 410 and the elongated plate of the secondary mechanical brake can be referenced as a pivotally mounted second plate 415. In the particular embodiment of the present invention as shown in FIG. 9F, the overload stop 454 has as an upside down "T" or up tac shape whereby one end of the overload stop 454 is anchored to the lower surface of the pivotally mounted first plate 410 (elongated plate of the primary brake) such that it is suspended from the pivotally mounted first plate 410 (elongated plate of the primary brake) and the other end provides a surface for contacting the lower surface of the pivotally mounted second plate 415 (elongated plate of the secondary brake). Until contact is made, there remains a gap or spacing 448 between the lower surface of the pivotally mounted second plate 415 (elongated plate of the secondary plate) and the surface of the overload stop 454. As with the primary brake, the height and thus, the spacing of the overload stop is adjustable.

The overload stop 454 of the secondary brake works in conjunction with a resiliently loaded (or supported) fulcrum 450*b* to prevent excessive loads being applied to the secondary brake mechanism. As with the pivotally mounted first plate 410 (elongated plate of the primary brake), the pivotally mounted second plate 415 (elongate plate of the secondary brake) tilts about a fulcrum 450*b* that is resiliently loaded such that the braking force is controlled by the loading of a resilient member 451*b*. As with the primary mechanical brake, the fulcrum 450*b* of the secondary mechanical brake can be resiliently loaded or supported by mounting the fulcrum 450*b* on a resilient member such as a spring as shown in FIG. 9A. Alternatively, the fulcrum can be resiliently supported by being mounted to an adjacent elongated plate, i.e. to the pivotally mounted first plate 410 (elongated plate of the primary brake) rather than being separately mounted. The resiliently loaded (or supported) fulcrum 450*b* of the secondary brake comprises a bracket 455 that is suspended from an underside of the pivotally mounted first plate 410 (elongated plate of the primary mechanical brake) and is biased up against the first end of the pivotally mounted first plate 410 (elongated plate of the primary brake) by the resilient member 451*b*. As with the resiliently loaded (or supported) fulcrum of the primary brake 450 shown in FIG. 9A, should excess force be applied in a downward direction after the secondary mechanical brake has been actuated, the pivotally mounted second plate 415 (elongated plate of the secondary brake) can be pulled downwards against the force of the resilient member 451*b* until the lower surface of the pivotally mounted second plate 415 (elongated plate of the secondary brake) contacts the overload stop 454 whereupon the pivotally mounted second plate 415 (elongated plate of the secondary brake) will tend to pivot about the overload stop 454 against the resilience of the resilient member 451*b* so as to permit movement of the brake shaft and/or output shaft through the bore/hole of the pivotally mounted second plate 415. Should the excess force be removed, the braking action of the secondary brake will be immediately restored and the brake shaft held in its new position.

Unlike the resiliently loaded (or supported) fulcrum of the primary brake whereby the fulcrum is mounted on a resilient member, the fulcrum 450*b* of the resiliently loaded (or supported) fulcrum of the secondary brake is not mounted directly on a resilient member. In the particular embodiment shown in FIG. 9F, the resilient member 451*b* is located on one arm of the bracket 455 and the fulcrum 450*b* is mounted to the another arm of the bracket 455. The bracket 455 adopts a "C" shape configuration, i.e. a post and an upper and a lower arm. The resilient member 451*b* is located at the upper portion of one arm of the bracket 455 and the fulcrum 450*b* is mounted to the lower portion of the other arm of the bracket 455. The bracket 455 is mounted or suspended from the underside of the pivotally mounted first plate 410 (elongated plate of the primary brake) and comprises a spring loaded support post having one end mounted to the underside of the elongated plate and a free end for supporting the resilient member 451*b*, more specifically the free end of the support post comprises a stop for supporting the resilient member 451*b*. The resilient member is located along the support post between the upper portion of the arm of the bracket and the stop of the support post. The stop, as shown in FIG. 9F, may be a plate substantially perpendicular to the rod.

The resilience of the resilient member supporting the fulcrum of both the primary and secondary brakes may be pre-loaded to a value, for example 650 N, which is above the maximum expecting payload. The expected payload is the sum of the output shaft and grip mass, which would typically be in the region of 100 N, but may be between 10 to 1000 N. Overload protection to protect excessive loads being applied to the brake mechanism may be called upon in the following scenarios:

A) The scenario whereby the power to the output shaft is switched off when travelling at a high speed, for example above approximately 0.5 m/s in the downwards direction and whilst in high power operating mode. In high power mode, the brake is not required to prevent output shaft drop, but it will still provide a retardation braking effect.

B) The scenario whereby the power to the output shaft is switched off from high power mode whilst holding a high tension load on a polymer specimen. In this case the strain energy in the specimen will cause the brake to become loaded above the pre-load value and the output shaft will pull through until the stored load is reduced to a particular value, for example, 600 N.

During operation of the overload protection, when the brake is in the normal "on" condition and holding the weight of the output shaft, there is small gap 449 between the lower surface of the elongated plate 410, 415 and the overload stop 452, 453, 454 of the primary brake mechanism or the secondary brake mechanism. This may be adjustable, and may optionally be adjusted to approximately 1 mm, although it may be fixed to any value between 0.1 to 10 mm. When the braking load exceeds the pre-set value of the resilient member of either the primary brake mechanism or the second brake mechanism, the fulcrum will move downwards as the elongated plate pivots or tilts about their respective overload stop 452, 453, 454, and consequently translate the entire elongated plate 410, 415 downwards. In this state, the mechanical brake is no longer self-energising and the limit of the braking force has been reached. If the output shaft load is increased further, the mechanical brake will slip (i.e. the output shaft will slip through binding force of the mechanical brake) at a constant load depending on the co-efficient of friction of the brake surfaces, e.g. brake shoes (insert)/brake shaft. For example, this could be 700 Newtons. Once the excess load is removed from the output shaft, the resilient member of the resiliently loaded (or supported) fulcrum automatically returns the mechanical brake to the normal state.

As discussed above, the limit stops 430, 430*b* are employed to prevent the elongated plate of the mechanical brake from tilting in the "off" condition and thereby, ensures that there is clearance between the edge of the bore of the secondary elongate plate and the brake shaft/output shaft so permitting the brake shaft and/or the output shaft to travel freely through the bore and/or the hole. In respect of the primary brake, the limit stop 430 is fixed to the frame of the test apparatus and is arranged to cooperate with a complementary shaped projection portion of the primary brake, more specifically the insert of the primary brake. In the particular embodiment shown in FIG. 9A, the projection portion adopts a frusto-conical shape. A similar arrangement is employed in the secondary mechanical brake. In a particular embodiment of the present invention, as shown in FIG. 9F, the elongated plate 415 of the secondary mechanical brake comprises a projecting portion 435 that cooperates with a second limit stop 430*b*; the first limit stop 430 being the limit stop of the primary mechanical brake. The second limit stop 430*b* may be positioned on the underside of the pivotally mounted first plate 410 (elongated plate of the primary mechanical brake). In the particular embodiment shown in FIG. 9F, the projecting portion 435 of the secondary mechanical brake has a frusto-conical shape that is arranged to be received in a complementary profile of the second limit stop 430*b*. By means of the cooperation between the secondary mechanical brake and the primary mechanical brake, the secondary mechanical brake is allowed to possess a similar function to the primary mechanical brake, i.e. limit stops 430, 430*b* to prevent the mechanical brake from engaging with the output shaft in the "off" condition and the resiliently loaded (or supported) fulcrum 450, 450*b* in combination with the overload stop 452, 453, 454 to provide overload protection of the secondary mechanical brake when in the "on" condition.

Any of the features of the primary mechanical brake can be applied to the secondary mechanical brake. For example, additionally, or optionally, the actuator road of the electrically actuated device 421*b* of the secondary mechanical brake can be coupled to the elongated plate 415 by an actuator rod extendable feature to allow the actuator rod of the secondary mechanical brake to retract further into its housing or solenoid when the projection portion 435 of the elongated plate 415 nests up against the limit stop 430*b* in the "off" condition, and thereby, either preventing the secondary mechanical brake rubbing against output shaft when in the "off" condition as well as providing maximum holding force for holding the elongated plate 415 of the secondary mechanical brake in the "off" condition.

Each option presented in any of the aspects above can be combined any other option of any aspect of the present invention unless specifically disclosed as alternatives.

Further Features

A. A method for controlling a braking system of an electromagnetic motor, the electromagnetic motor having a moveable output shaft, comprising the steps of:

receiving a velocity signal and/or an acceleration signal based on movement of the output shaft, said velocity signal and/or acceleration signal having a respective frequency spectrum;

identifying an event from the velocity and/or the acceleration signal using the respective frequency spectrum, wherein said event corresponds to an uncontrolled movement of the output shaft and has a characteristic frequency spectrum.

B. The method of feature A, wherein identifying the event comprises filtering the velocity and/or acceleration signal to attenuate one or more frequency components of the frequency spectrum.

C. The method of feature B, wherein the one or more frequency components attenuated by the filter represents a part or a whole of a frequency profile of the uncontrolled movement of the output shaft that does not pose a risk to an operator.

D. The method of feature C, wherein uncontrolled movement of the output shaft up to a predetermined movement threshold corresponds to the uncontrolled movement of the output shaft that does not pose a risk to the operator.

E. The method of feature D, wherein the predetermined movement threshold is in the range 0 mm to 200 mm or 0 mm to 60 mm.

F. The method of any of the preceding features A to E, wherein the velocity signal and/or acceleration signal corresponding to the movement of the output shaft is determined from at least one of the following:

i) a displacement detector, ii) a velocity detector, or iii) an acceleration detector.

G. The method of any features B to F, wherein filtering the frequency spectrum comprises directing the velocity signal and/or acceleration signal through a finite impulse response low-pass filter.

H. The method of any features B to G, wherein identifying said event comprises comparing a filtered velocity signal and/or filtered acceleration signal with a predetermined velocity threshold and/or acceleration threshold.

I. The method of feature H, wherein the predetermined velocity threshold is in the range 0 mm/s to 100 mm/s for linear movement and/or in the range 0 deg/s to 360 deg/s for rotary movement.

J. The method of feature I, wherein the predetermined velocity threshold is about 10 mm/s for linear movement and/or 30 deg/s for rotary movement.

K. The method of feature H, wherein the predetermined acceleration threshold is in the range 5 $mm/s^2$ to 30 $mm/s^2$ for linear movement and/or in the range 0 $deg/s^2$ to 500 $deg/s^2$ for rotary movement.

L. The method of feature K, wherein the predetermined acceleration threshold is about 30 $mm/s^2$ for linear movement and/or 90 $deg/s^2$ for rotary movement.

M. The method of any of the preceding features A to L, wherein upon identifying said event, arresting the output shaft, comprising the step of applying an electrical braking effect using the coil assembly and/or actuating a mechanical brake.

N. The method of feature M, wherein arresting the output shaft involves actuating a solid state relay switch.

O. A control system for controlling the braking system of a electromagnetic motor having a moveable output shaft, using the method of any of the preceding features A to N, comprising:

a safe speed monitor (SSM) comprising a filter.

P. The control system of feature O, wherein the SSM comprises a comparator for comparing a velocity and/or acceleration of the output shaft with a predetermined velocity and/or acceleration threshold.

Q. The control system of feature O or P, wherein the SSM comprises a decimator for reducing the sample rate of an input signal, the input signal comprising the velocity signal and/or acceleration signal.

R. The control system of any of the features O to Q, comprising a Safe Torque OFF (STO) device for actuating a brake system to arrest the output shaft.

S. A test apparatus comprising:

the control system of any of the features O to R;

an electromagnetic motor having a moveable output shaft; and a braking system for arresting the output shaft.

T. A method for preventing motion of an output shaft, of an electromagnetic motor comprising a coil assembly, when a mechanical brake is released, comprising the steps of:

determining the position of the output shaft;

determining a current based on the position of the output shaft that when applied in the coil assembly induces a force on the output shaft to prevent motion of the output shaft when the mechanical brake is released; and applying the current to the coil assembly.

U. The method of feature T, further comprising using a look-up table to determine the current applied to the coil assembly based on the position of the output shaft.

V. The method of feature T or U, wherein the position of the output shaft is determined by a graduated scale attached to the output shaft that cooperates with an encoder.

W. A method for generating a look-up table for correlating a current to be applied to a coil assembly of linear electromagnetic motor with a position of an output shaft of the linear electromagnetic motor so as to prevent movement of the output shaft when a mechanical brake is released, comprising the steps of:

determining a first current needed to hold the output shaft in a first position;

determining, a second current needed to hold the output shaft in a second position;

storing the first and second positions together with the first current and second current in the look-up table.

X. The method of feature W, wherein the difference between the first position and the second position is less than 4 mm or less than 3 mm or less than 2 mm.

Y. The method of feature W or X, comprising the step of:

a) displacing the output shaft axially;

b) sampling the current of the coil assembly at fixed intervals of the displacement of the output shaft.

Z. A braking system for controlling displacement of a linear electromagnetic motor having a linearly moveable output shaft, using the method of any of the features T to Y, comprising:

a mechanical brake, a controller for receiving the position of the output shaft and configured to apply an electrical current to the coil assembly to prevent motion of the output shaft when the mechanical brake is released.

AA. The braking system of feature Z, wherein the mechanical brake comprises a resilient member for damping the release of the brake from the output shaft such that an impulse, experienced by the output shaft, generated by the release of the brake is decreased.

AB. A method for monitoring the performance of a mechanical brake for a linear electromagnetic motor, the linear motor having a linearly moveable output shaft, comprising monitoring travel of the output shaft over the duration of actuation of the mechanical brake and comparing said travel with a predetermined travel threshold.

AC. The method of feature AB, wherein monitoring travel of the mechanical brake comprises:

detecting a first position corresponding to the position of the output shaft when the mechanical brake is initially actuated such that the mechanical brake is engaged with the output shaft;

detecting a second position corresponding to the position of the output shaft at a predetermined time or when the output shaft comes to rest after the first position is detected;

determining the travel by calculating the distance between the first position and the second position.

AD. The method of feature AB or AC, comprising the step of:

storing the travel.

AE. The method of any of the preceding features AB to AD, wherein if the travel exceeds the predetermined travel threshold, comprising:

alerting a user to the degree of travel.

AF. The method of any of the features AC to AE, wherein detecting the first position is triggered by an optical sensor detecting that the mechanical brake is engaged with the output shaft.

AG. The method of any of the preceding features AB to AF, wherein the predetermined time is between 0.1 s and 1 s.

AH. The method of feature AG, wherein the predetermined time is 0.25 s.

AI. The method of any of the preceding features AB to AH, comprising the step of:

counting the number of actuations of the mechanical brake.

AJ. The method of feature AI, comprising alerting a user of the number of actuations of the mechanical brake.

AK. The method of feature AI or AJ, comprising alerting a user when the number of actuations of the mechanical brake exceeds a predetermined threshold.

AL. The method of any of the features AB to AK, comprising the step of:

communicating the travel and/or number of actuations to a third party for monitoring.

AM. The method of any preceding feature AB to AL, wherein the predetermined travel threshold is between 0 mm and 10 mm.

AN. The method of feature AM, wherein the predetermined travel threshold is about 2 mm.

AO. A mechanical brake for arresting movement of the output shaft of a linear electric motor, comprising:

a pivotally mounted plate having a space for receiving the output shaft of the motor;

an electrically operated holding device contacting a free end of the plate and arranged to hold the plate in a condition to permit movement of the output shaft and to permit the plate to pivot to a jamming position;

wherein the electrically operated holding device comprises a solenoid to control the movement of the plate.

AP. The mechanical brake of feature AO, wherein the solenoid is a linear solenoid.

AQ. The mechanical brake of feature AP, wherein the solenoid acts on a rod, the rod freely coupled to the free end of the plate, wherein the rod is vertically moveable.

AR. The mechanical brake of any of the features AO to AQ, wherein the rod is coupled to the free end of the plate by a coupling device, said coupling device comprises a resiliently extendable member coupled to the free end of the actuator rod such that in the extended position of the resiliently extendable member, the actuator rod retracts further into the solenoid than in a non-extended position of the resiliently extendible member.

AS. The mechanical brake of feature AR, wherein the resiliently extendable member is a pre-loaded tension spring.

AT. The mechanical brake of feature AR or AS, wherein the resiliently extendable member is extendable in the range between 0.1 mm and 10 mm or between 3 mm and 4 mm.

AU. The mechanical brake of feature of any of the features AR to AT, wherein the resiliently extendable member comprises an insert moveable within a flanged housing and biased in the extended position.

AV. The mechanical brake of any preceding features AO to AU, wherein the electrically operated holding device is arranged to hold the plate in a condition to permit movement of the output shaft while electrical power is applied to the electrically operated holding device.

AW. The mechanical brake of feature AV, wherein the plate contacts a limit stop to permit movement of the output shaft.

AX. The mechanical brake of feature AW, wherein the pivotally mounted plate comprises a projection portion that cooperates with the limit stop.

AY. The mechanical brake of feature AX, wherein the projection portion is a frusto-conically shaped projection receivable in the limit stop.

AZ. The mechanical brake of any preceding features AO to AY, wherein the electrically operated holding device is arranged to permit the plate to pivot to a jamming position in the absence of electrical power applied to the electrically operated holding device.

BA. The mechanical brake of any preceding features AO to AZ, wherein the mechanical brake comprises a resilient member arranged to bias the plate towards the jamming position.

BB. The mechanical brake of feature BA, wherein the resilient member comprises a spring.

BC. The mechanical brake of feature BB, wherein the spring is a compression or extension or tension spring.

BD. The mechanical brake of any of the features BA to BC, wherein the resilient member is coupled to the plate.

BE. The mechanical brake of feature BD, wherein the resilient member is coupled to the free end of the plate.

BF. The mechanical brake of any feature AO to BE, wherein the mechanical brake comprises a stop spaced apart from a lower surface of the plate and arranged to contact the lower surface of the plate when a force acting on the plate by the output shaft exceeds a threshold.

BG. The mechanical brake of feature BF, wherein the plate is pivotally mounted on a resiliently loaded fulcrum comprising a fulcrum supported by a resilient member, said resiliently loaded fulcrum is capable of movement when the force acting on the plate by the output shaft exceeds the threshold such that the plate pivots about the stop and overcomes the biasing force of the resilient member and the plate is held to allow movement of the output shaft.

BH. The mechanical brake of feature BF or BG, wherein the spacing between the stop and the lower surface of the plate is adjustable.

BI. The mechanical brake of any of the features AO to BH, wherein the electrically operated holding device further comprises an electrically operated lifting device for contacting the free end of the plate and arranged to lift the plate in the condition to permit movement of the output shaft.

BJ. The mechanical brake of feature BI, wherein the electrically operated lifting device for lifting the plate comprises a solenoid, wherein the solenoid acts on a rod to releasably engage or couple with the free end of the plate.

BK. The mechanical brake of any of the features AO to BJ, wherein the mechanical brake is a primary mechanical brake and wherein the mechanical brake further comprises a secondary mechanical brake, said secondary mechanical brake is the mechanical brake as defined in any of the features AK to BF.

BL. The mechanical brake of feature BK, wherein the primary mechanical brake is rotationally offset of the secondary mechanical brake about the longitudinal axis of the output shaft such that their respective plates pivots about non-parallel axes.

BM. The mechanical brake of feature BK or BL, wherein the respective plates of the primary mechanical brake and the secondary mechanical brake are arranged to pivot independently in a sequence or simultaneously.

BN. The mechanical brake of any of the features BK to BM, wherein the primary mechanical brake comprises a pivotally mounted first plate and the secondary mechanical brake comprises a pivotally mounted second plate, each of the pivotally mounted first and second plate comprise a space that are co-axial for receiving the output shaft of the motor, wherein the secondary mechanical brake cooperates with the primary mechanical brake to provide a second stop spaced apart from a lower surface of the pivotally mounted second plate and arranged to contact the lower surface of the pivotally mounted second plate when a force acting on the pivotally mounted second plate by the output shaft exceeds a threshold.

BO. The mechanical brake of feature BN, wherein the second stop is mounted to the pivotally mounted first plate.

BP. The mechanical brake of feature BN or BO, wherein the secondary mechanical brake cooperates with the primary mechanical brake to provide a second resiliently supported fulcrum, said second resiliently loaded fulcrum is capable of movement when the force acting on the second plate by the output shaft exceeds the threshold such that the second plate pivots about the second stop and overcomes the biasing force of the resilient member of the second resiliently loaded fulcrum.

BQ. The mechanical brake of feature BP, wherein the second resiliently loaded fulcrum is resiliently mounted to the pivotally mounted first plate.

BR. The mechanical brake of any of the features BN to BQ, wherein the pivotally mounted second plate contacts a second limit stop positioned on the underside of the pivotally mounted first plate when the secondary mechanical brake is not engaged with the output shaft.

BS. The mechanical brake of feature BR, wherein pivotally mounted second plate comprises a projection portion that cooperates with the second limit stop.

BT. The mechanical brake of any of the features BK to BS, wherein the primary and secondary mechanical brakes are engageable with the output shaft simultaneously.

BU. The mechanical brake of feature BT, wherein engagement of the output shaft by the secondary mechanical brake is released prior to the primary mechanical brake by a predetermined amount of time.

BV. The mechanical brake of any of the features BK to BU, wherein the pivotally mounted second plate is vertically offset from the pivotally mounted first plate.

BW. A device for arresting an output shaft of an electromagnetic motor, said output shaft being moveable, comprising:

- a coil assembly circuit comprising a plurality of separate coil loops configured to cause movement of an output shaft of the linear motor while electrical power is applied;
- a switching device configured to form an electrical connection between the plurality of separate coil loops of the coil assembly circuit such that movement of the output shaft is arrested; and
- an opto-isolator for actuating the switching device.

BX. The device of feature BW, wherein the opto-isolator comprises an LED and a photovoltaic cell.

BY. The device of feature BW or BX, wherein the switching device comprises at least one back to back MOSFET device electrically coupled to each of the separate coil loops such that in use, under normal operation, coil loop separation is maintained so as to prevent current flow through the MOSFET device.

BZ. The device of any feature BW to BY, wherein the device comprises a TVS diode for protecting the MOSFET device from the current exceeding a threshold.

CA. A test apparatus comprising:

a control system of any feature O to R;

a electromagnetic motor having a moveable output shaft; and at least one of:

a mechanical brake for arresting the output shaft according to any of the features AO to BV;

a device for arresting the output shaft according to any of the features BW to BZ; or a braking system for controlling displacement of the linear motor according to feature Z or AA.

CB. The test apparatus of feature CA, wherein the motor is arranged in a vertical and/or horizontal orientation.

What is claimed is:

1. A method for monitoring the performance of a mechanical brake for a linear electromagnetic motor, the linear electromagnetic motor having a linearly moveable output shaft, the linear electromagnetic motor incorporated into a test apparatus and oriented such that an axis of the output shaft is offset from horizontal, the method comprising:

- actuating the mechanical brake to move the mechanical brake into engagement with the output shaft in an effort to prevent linear movement of the output shaft;
- monitoring travel of the output shaft over the duration of actuation of the mechanical brake and comparing said travel with a predetermined travel threshold, wherein the predetermined travel threshold is between 0 mm and 10 mm.

2. The method of claim 1, wherein monitoring travel of the output shaft comprises:

detecting a first position corresponding to the position of the output shaft when the mechanical brake is initially actuated into engagement with the output shaft;

detecting a second position corresponding to the position of the output shaft at a predetermined time or when the output shaft comes to rest after the first position is detected;

determining the travel by calculating the distance between the first position and the second position.

3. The method of claim 2, comprising the step of:

storing the travel.

4. The method of claim 2, wherein detecting the first position is triggered by an optical sensor detecting that the mechanical brake is engaged with the output shaft.

5. The method of claim 2, wherein the predetermined time is between 0.1 s and 1 s.

6. The method of claim 5, wherein the predetermined time is 0.25 s.

7. The method of claim 1, wherein if the travel exceeds the predetermined travel threshold, comprising:

alerting a user to the degree of travel.

8. The method of claim 1, comprising the step of:

counting a number of actuations of the mechanical brake.

9. The method of claim 8, comprising alerting a user of the number of actuations of the mechanical brake.

10. The method of claim 8, comprising alerting a user when the number of actuations of the mechanical brake exceeds a predetermined threshold.

11. The method of claim 8, comprising the step of:

communicating the travel and/or the number of actuations to a third party for monitoring.

12. The method of claim 1, wherein the predetermined travel threshold is about 2 mm.

13. The method of claim 1, wherein the mechanical brake includes a brake shoe that engages the output shaft in the effort to prevent movement of the output shaft.

* * * * *